United States Patent
Geiser

(10) Patent No.: US 11,953,638 B2
(45) Date of Patent: Apr. 9, 2024

(54) METHODS FOR CREATING A CRITICAL CRUST RESERVOIR MODEL

(71) Applicant: G-O-Image, LLC, Lyons, CO (US)

(72) Inventor: Peter Geiser, Lyons, CO (US)

(73) Assignee: G-O-Image, LLC, Lyons, CO (US)

(*) Notice: Subject to any disclaimer, the term of this patent is extended or adjusted under 35 U.S.C. 154(b) by 0 days.

(21) Appl. No.: 17/612,541

(22) PCT Filed: May 22, 2020

(86) PCT No.: PCT/US2020/034337
§ 371 (c)(1),
(2) Date: Nov. 18, 2021

(87) PCT Pub. No.: WO2020/242986
PCT Pub. Date: Dec. 3, 2020

(65) Prior Publication Data
US 2022/0299667 A1 Sep. 22, 2022

Related U.S. Application Data

(60) Provisional application No. 62/852,641, filed on May 24, 2019.

(51) Int. Cl.
*G01V 1/30* (2006.01)
*E21B 49/00* (2006.01)

(52) U.S. Cl.
CPC ............ *G01V 1/306* (2013.01); *E21B 49/001* (2013.01); *G01V 2210/1234* (2013.01); *G01V 2210/6246* (2013.01)

(58) Field of Classification Search
CPC ........... G01V 1/306; G01V 2210/1234; G01V 2210/6246; G01V 1/50; E21B 49/001
See application file for complete search history.

(56) References Cited

U.S. PATENT DOCUMENTS

| | | | |
|---|---|---|---|
| 6,389,361 | B1 | 5/2002 | Geiser |
| 7,127,353 | B2 | 10/2006 | Geiser |
| 9,075,158 | B2 | 7/2015 | Geiser |
| 9,194,967 | B2 | 11/2015 | Lacazette et al. |
| 9,389,326 | B2 | 7/2016 | Vermilye et al. |
| 9,442,205 | B2 | 9/2016 | Geiser et al. |

(Continued)

OTHER PUBLICATIONS

Angus et al. (2013) "Using micro-seismicity to estimate formation permeability for geological storage of CO2," Research Article, Hindawi Publishing Corporation, ISRN Geophysics, vol. 2013, Article ID 160758, 7 pp.

(Continued)

*Primary Examiner* — John E Breene
*Assistant Examiner* — Yaritza H Perez Bermudez
(74) *Attorney, Agent, or Firm* — Leydig, Voit & Mayer, Ltd.

(57) ABSTRACT

Provided herein are systems and methods for generating reservoir models including the SOC nature of the Earth's crust. The methods employ seismic emission tomography (SET) to generate three dimensional models of a formation providing permeability without the need for traditional reservoir modeling techniques and allowing for the identification of naturally-occurring permeability pathways that provide accurate and precise locations for the efficient recovery of hydrocarbons or other fluids.

19 Claims, 15 Drawing Sheets

(56) References Cited

U.S. PATENT DOCUMENTS

| | | | |
|---|---|---|---|
| 9,557,433 B2 | 1/2017 | Geiser et al. | |
| 9,810,803 B2 | 11/2017 | Vermilye et al. | |
| 10,145,227 B2 | 12/2018 | Hilpert et al. | |
| 11,098,565 B2 | 8/2021 | Hilpert et al. | |
| 2006/0047431 A1* | 3/2006 | Geiser | G01V 1/306 702/14 |
| 2008/0210470 A1* | 9/2008 | Stewart | E21B 47/06 175/48 |
| 2009/0139322 A1 | 6/2009 | Montaron et al. | |
| 2011/0066380 A1 | 3/2011 | Hager et al. | |
| 2013/0201787 A1 | 8/2013 | Vermilye et al. | |
| 2013/0282291 A1* | 10/2013 | Dasgupta | G01V 1/30 702/13 |
| 2014/0019054 A1 | 1/2014 | De Prisco et al. | |
| 2014/0019057 A1 | 1/2014 | Diller | |
| 2016/0124116 A1 | 5/2016 | Souche et al. | |
| 2016/0202373 A1* | 7/2016 | Diller | G01V 1/288 367/56 |
| 2016/0231444 A1 | 8/2016 | Lacazette et al. | |
| 2018/0003841 A1 | 1/2018 | Souche | |
| 2018/0095184 A1* | 4/2018 | Hogarth | G01V 1/282 |
| 2018/0258763 A1 | 9/2018 | King, Jr. et al. | |
| 2022/0136382 A1 | 5/2022 | Geiser et al. | |

OTHER PUBLICATIONS

Heffer (2005) "The NERC Micro to Macro Programme: Implications for fluid reservoir management," in Shaw R. P. (ed.) 2005. Understanding the Micro to Macro Behavior of Rock Fluid Systems, Geol. Soc. London, Spec. Publication 249, 5-27.

International Search Report and Written Opinion dated Jul. 30, 2020 in International Application No. PCT/US2020/034337, 12 pp.

Leary (1997) "Rock as critical-point system and the inherent implausibility of reliable earthquake prediction," Geophys. J. Int. 131:451-466.

Leary et al. (Feb. 2020) "Flow-Imaging of Convective Geothermal Systems—Obtaining Seismic Velocity Models Needed for Production Well Targeting," Proceedings, 45th Workshop on Geothermal Reservoir Engineering, Stanford University, Stanford, California, Feb. 10-12, 2020, SGP-TR-216, 13 pp.

Leary et al. (Jul. 2020) "Seismic Imaging of Convective Geothermal Flow Systems to Increase Well Productivity," Journal of Energy and Power Technology 2(3):28; doi:10.21926/jept.2003012.

Leary et al. (Mar. 2021) "Crustal Reservoir Flow Simulation for Long-Range Spatially-Correlated Random Poroperm Media," Journal of Energy and Power Technology 3(1):19; doi: 10.21926/jept.2101013.

Malin et al. (Jan. 2020) "Observational and Critical State Physics Descriptions of Long-Range Flow Structures," Geosciences 10(2), 50; https://doi.org/10.3390/geosciences10020050.

Michelena et al. (Feb. 2019) "Seismic, geologic, geomechanics, and dynamic constraints in flow models of unconventional fractured reservoirs: Example from a south Texas field," The Leading Edge 38: 116-122.

Petrofaq.org "List of Reservoir Simulation Software," Accessed at least as early as Apr. 4, 2019. http://petrofaq.org/wiki/List_of_Reservoir_Simulation_Software.

Raleigh et al. (1976) "An experiment in earthquake control at Rangely, Colorado," Science 191: 1230-1237.

Sicking et al. (Dec. 2019) "Fracture Seismic: Mapping Subsurface Connectivity," Geosciences 9(12), 508; https://doi.org/10.3390/geosciences9120508.

Tary et al. (2014) "Characteristics of fluid induced resonances observed during microseismic monitoring," Journal of Geophysical Research: Solid Earth, 119, 8207-8222.

Tary et al. (2014) "Interpretation of resonance frequencies recorded during hydraulic fracturing treatments," Journal of Geophysical Research: Solid Earth 119 (2), 1295-1315.

Vermilye et al. (1998) "The process zone: A microstructural view of fault growth," J. Geophys. Research—Solid Earth 103, 12223-12237.

* cited by examiner

METHODS FOR CREATING A CRITICAL CRUST RESERVOIR MODEL

CROSS REFERENCE TO RELATED APPLICATIONS

This application is a U.S. National Stage Application filed under 35 U.S.C. § 371 of International Application No. PCT/US2020/034337, filed May 22, 2020, which claims the benefit of U.S. Provisional Patent Application No. 62/852,641 filed on May 24, 2019, which is incorporated herein by reference to the extent not inconsistent herewith.

BACKGROUND OF INVENTION

Reservoir modeling in the oil and gas industry is of critical importance for the efficient recovery of hydrocarbons. A goal of reservoir modeling is estimating the permeability of a hydrocarbon-containing formation allowing for optimization of recovery of the hydrocarbons by positioning wellbores in or adjacent to high permeability portions of the formation.

Modern reservoir modeling typically uses a complex, multifaceted approach with a large number of implicit and explicit assumptions to estimate or calculate the permeability of a formation. Commonly, a combination of both heuristic and stochastic modeling methods combining models based on spatially random distribution, non-random distribution and independent distribution are used to generate the reservoir model. Models are then adjusted and refined based on production data from completed wells within the formation. Permeability, among other properties, is estimated based on the model.

However, the Earth's brittle crust is a self-organizing critical (SOC) system which inherently has highly heterogeneous permeability pathway. These pathways follow the Gutenberg-Richter law statistically resulting in a relatively small number of pathways providing permeability that is orders of magnitude higher than the surrounding formation. This property is not sufficiently accounted for in modern reservoir modeling. As a result, wellbores that do communicate with these pathways are extremely productive, but because modern modeling techniques fail to accurately approximate these pathways, wells that interact with them are relatively rare and rely on a high degree of chance. This is a factor in why approximately 10% of completed wells provide 90% of the production in a given field.

It can be seen from the foregoing that there remains a need in the art for reservoir modeling methods that account for and identify or estimate the self-organizing critical nature of fracture evolution. These methods may allow the identification of pathways that have permeabilities orders of magnitude higher than the surrounding rock and provide ideal locations for the placement of wells to enhance hydrocarbon recovery. It is further desirable to provide a method that is far more cost effective, requiring far fewer assumptions, while achieving improved accuracy and being quicker to create.

SUMMARY OF THE INVENTION

Provided herein are systems and methods for generating reservoir models incorporating the SOC nature of the Earth's crust. The methods employ seismic emission tomography (SET), and are commercially referred to as either "Fracture Seismic" or Tomographic Fracture Imaging (TFI) to generate three dimensional models of a formation providing permeability architecture without the need for traditional reservoir modeling techniques and allowing for the identification of naturally-occurring permeability pathways that provide excellent locations for the efficient recovery of hydrocarbons. In this manner, the productivity of wells can be increased by providing better informed placement location, thereby increasing the fraction of wells that are considered highly productive and improving the 10% of completed wells providing 90% of production in a given field statistic.

U.S. Pat. No. 7,127,353 describes use of SET technology within the oil and gas industry and is hereby incorporated by reference in its entirety. Skeletonization of SET data has been previously employed to describe hydraulically induced fractures in a formation and is described in U.S. Pat. No. 9,557,433, which is also incorporated by reference in its entirety. Described herein is the skeletonization of SET data to generate reservoir models and identify naturally occurring high permeability pathways. U.S. Pat. No. 10,145,227 describes the use of seismic technology and the generation of pressure waves to determine permeability and is also incorporated by reference in its entirety.

The described methods may provide for determining a true permeability (e.g. the actual permeability at a given resolution) of a geologic formation.

In an aspect, provided is a method for determining a permeability field architecture of at least a portion of a fluid reservoir, comprising: i) establishing a seismic array in the vicinity of a wellbore in fluid communication with the fluid reservoir; wherein the seismic array is operable to acquire seismic energy emission data and the seismic array comprises a plurality of seismic energy sensors; ii) generating a change in fluid pressure is the fluid reservoir to see well connection to reservoir permeability field; iii) acquiring seismic energy emission data from the seismic array prior to (e.g., passive monitoring to image ambient permeability field) and after the change in fluid pressure; iv) processing a selected portion of the seismic energy emission data to generate a three dimensional spatial representations of a fluid pressure wave through the portion of the fluid reservoir; and v) determining a permeability field architecture of the portion of the fluid reservoir based on the fluid pressure wave and/or fluid flow. The method may deploy a geophone array, which may be either on the surface, buried, or a mixture of surface and buried. The data from the seismic (e.g., geophone) array is collected. Noise is filtered and SET is applied to reveal the permeability field. The change in fluid pressure may be used as described in U.S. Pat. No. 10,145,227 to calculate the permeability scalar (K) and/or the processing step may comprise the method of skeletonization described in U.S. Pat. No. 9,557,433, allowing for K values to be assigned to various individual pathways within the reservoir. In this manner, the application of a pressure pulse reveals the high permeability pathways, including those pathways connected to the well. The high permeability pathways are referred to as "Active Fracture Images" (AFI). The AFI are embedded in "country rock", which has a much lower permeability than the AFI. In this manner, the permeability field is described as having two components: country rock and high permeability pathways (AFI).

As described herein, the provided method may generate a reservoir model or a true representation of a reservoir permeability field or formation that identifies high permeability pathways that occur naturally due to fractures and faults within the formation. Identification of these pathways allows for the facile, efficient recovery of hydrocarbons present in the formation. The recognition that the reservoir is a SOC system along with either skeletonization or use of the "peak Picker" tool to find the zones of highest permeability relative to the surrounding formation allow complete mapping of the permeability field architecture. This important distinction may result in the ability to recover a substantial portion of the hydrocarbons within the reservoir with fewer, more efficient wells, by informing the position of well(s) in and around the formation.

The permeability field architecture may include naturally occurring fractures and faults in the fluid reservoir. The described methods may further comprise identifying at least one, at least two, or optionally at least three high permeability pathways in the fluid reservoir. The permeability pathway may have a permeability selected from the range of 10 to 1,000 times, 10 to 10,000 times, 10 to $10^6$ times or optionally, 1,000 to 10,000 times the average permeability of the country rock of the fluid reservoir. The high permeability pathway may correspond to a medial surface of the fluid reservoir.

The described method may further comprise generating a permeability model, from the fluid pressure wave propagating through the portion of the fluid reservoir. The processing step may further comprise identifying a semblance band, an intensity band, an amplitude band, an energy band or a combination thereof. Semblance may be used as a proxy for the energy value with less computational power required in the processing step. All energy and energy proxies (e.g. semblance), nonetheless, may be computed. The method and/or processing step may further comprise utilizing semblance filtering techniques known in the art, for example, in any one or more of U.S. Pat. Nos. 7,127,353; 9,557,433; and 10,145,227, which are specifically incorporated by reference herein for the semblance filtering techniques described therein.

The permeability field architecture may comprise a plurality of voxels and each of the voxels has a determined permeability. Each of the voxels has a lateral dimension, a vertical dimension or both. The methods are compatible with any voxel size, with smaller voxel sizes providing improved precision. For example, the voxels may have dimensions less than or equal to 20 m, less than or equal to 10 m, or optionally less than or equal to 5 m. The effective voxel size is constrained by the wavelength of the seismic wave traveling through the field, with current technologies providing a smallest effective voxel size of about 8 m. Data processing and interpolation can effectively reduce that size to about 5 m. Accordingly, voxel sizes are commonly between about 10 m and 20 m. Other methods of determining a permeability field architecture may be known in the art and may also be utilized to convert the seismic data (e.g. semblance) into a permeability field architecture including a true representation of the permeability of the reservoir or formation.

The step of acquiring seismic energy emission data may occur continuously over a period of time. The step of processing the selected portion of the seismic energy data may include generating a time lapse display. The time period may comprise the step of generating a change of fluid pressure (e.g. generating a fluid pressure wave) in the fluid reservoir. The step of processing the selected portion of seismic energy data further comprises determining a permeability scalar of the fluid reservoir. The permeability scalar is determined from a velocity of a fluid pressure wave through the portion of the fluid reservoir or by other various methods. The fluid reservoir may contain hydrocarbons, including a commercially-relevant amount of hydrocarbons that is economically feasible to extract. In other words, the cost of extraction is at least less than the revenue generated by the sale of the extracted hydrocarbon (or a downstream processed material thereof).

In an aspect, provided is a method for determining a permeability field architecture of at least a portion of a fluid reservoir, comprising: i) establishing a seismic array in the vicinity of a wellbore in fluid communication with the fluid reservoir; wherein the seismic array is operable to acquire seismic energy emission data and the seismic array comprises a plurality of seismic energy sensors; ii) Using the seismic array to map the ambient permeability field, iii) generating a change in fluid pressure in the fluid reservoir; iii) continuously acquiring seismic energy emission data from the seismic array during the change in fluid pressure; iv) processing a selected portion of the seismic energy emission data to generate a plurality of voxels corresponding to three dimensional spatial representations of fluid flow through the portion of the fluid reservoir, wherein the processing step includes identifying a semblance band for the data (or, for example, using a "Peak Picker" tool to locate voxels with the highest semblance value that are connected to one another); v) generating a value of the permeability scalar K from a velocity of a fluid pressure wave through the portion of the fluid reservoir; and vi) determining a permeability field architecture of the portion of the fluid reservoir based on the fluid flow.

In an aspect, provided is a method for identifying a high permeability pathway in a permeability field architecture of at least a portion of a fluid reservoir, comprising: i) establishing a seismic array in the vicinity of a wellbore in fluid communication with the fluid reservoir; ii) wherein the seismic array is operable to acquire seismic energy emission data and the array comprises a plurality of seismic energy sensors; iii) generating a change in fluid pressure is the fluid reservoir; iv) acquiring seismic energy emission data from the seismic array prior to and after the change in fluid pressure; v) processing a selected portion of the seismic energy emission data to generate three dimensional spatial representations of fluid flow through the portion of the fluid reservoir; vi) determining a permeability field architecture of the portion of the fluid reservoir based on a fluid pressure wave generated from the fluid flow; and vii) identifying at least one high permeability pathway in the fluid reservoir.

The step of acquiring seismic energy emission data may occur continuously over a period of time and the step of processing the selected portion of the seismic energy data may include generating a time lapse display.

Any of the methods may have a permeability field architecture that includes naturally occurring fractures and faults in the fluid reservoir as well as any frack (frac) induced fractures.

Any of the methods may further comprise identifying at least one high permeability pathway in the fluid reservoir, including two, three or four high permeability pathways. In this manner, a better informed decision can be made with respect to the drilling location of one or more wells in the fluid reservoir, with wells preferably positioned at or adjacent to a high permeability pathway, so that at least a portion of the well intersects one or more than one high permeability pathways.

The high permeability pathway may be characterized by a permeability selected from the range of 10 to $10^6$ times, including even higher than $10^6$ the average permeability of said portion of said fluid reservoir, such as the average permeability of the country rock. This reflects that the methods herein are compatible with any size fracture or fissure, including very large dimensions having a correspondingly very high permeability relative to the surrounding country rock.

The high permeability pathway may correspond to a medial surface of said fluid reservoir.

Any of the methods may further comprise generating a permeability model, from the fluid pressure wave propagating through said portion of said fluid reservoir.

Any of the methods may have a processing step the further comprises identifying a semblance band or using a peak picker method to locate all the highest semblance values that form a surface one voxel in thickness. In this manner, the surface generated by the peak picker is, in and of itself, effectively a type of semblance band.

Any of the methods may further comprise utilizing semblance filtering techniques.

Any of the methods may have a permeability field architecture comprising a plurality of voxels and each of the voxels has a determined permeability.

The voxels may have a lateral dimension, a vertical dimension or both, including independently selected, of between 10 m and 20 m, such as less than or equal to 20 m, less than or equal to 10 m, less than or equal to 5 m, and/or greater than or equal to 1 m, 2 m, 3 m or 5 m, and any combinations thereof. In this manner, the field may be described as having a certain resolution The step of acquiring seismic energy emission data may occur continuously over a period of time.

The step of processing said selected portion of said seismic energy data may include generating a time lapse display.

The time period may comprise said step of generating a change of fluid pressure in said fluid reservoir.

The step of processing said selected portion of seismic energy data may further comprise determining a permeability scalar of said fluid reservoir.

The permeability scalar may be determined from a velocity of a fluid pressure wave through said portion of said fluid reservoir.

Any of the methods may be for a fluid reservoir containing a fluid, such as hydrocarbons, water, $CO_2$, or any of another fluid depending on the application of interest, or that is expected to contain the fluid, including hydrocarbons, including commercially-relevant amounts of hydrocarbons that are economically feasible to extract.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

In general, the terms and phrases used herein have their art-recognized meaning, which can be found by reference to standard texts, journal references and contexts known to those skilled in the art. The following definitions are provided to clarify their specific use in the context of the invention.

As used herein, "Permeability Field Architecture" refers to a representation of the permeability of a geologic formation such as a fluid reservoir. Permeability field architecture may refer to a reservoir model and/or a true representation of the permeability of the formation. Permeability field architectures may be three dimensional images and have a resolution corresponding to the number of voxels present in the image, and the dimensions or volume of each voxel. Permeability field architecture may include additional information including directional flow information, hydraulic conductivity, etc.

Figure 1:
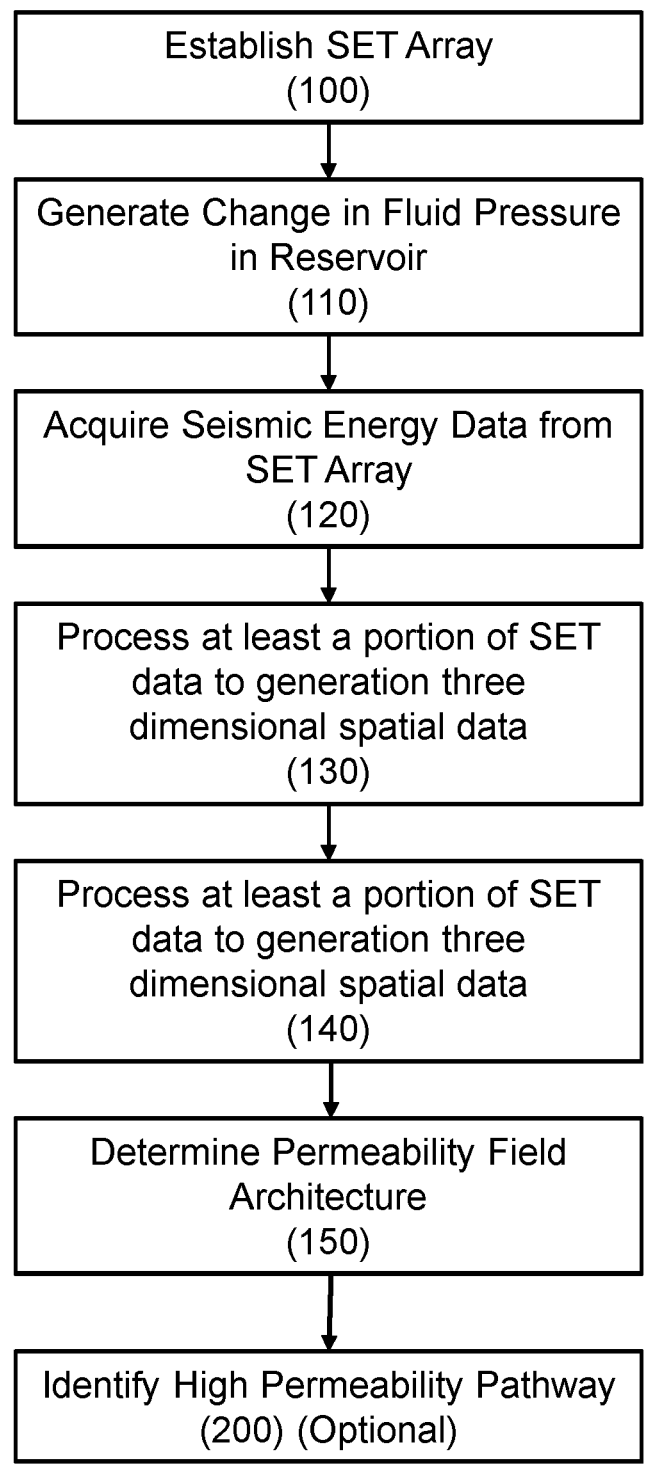
FIG. 1 is a flowchart of a method for determining a field permeability architecture as described herein.

"Seismic Emission Tomography" or "SET" refers to the collection and analysis of seismic waves from sources within the study volume (e.g. geologic formation, reservoir) to provide information about a below surface geologic formation or fluid reservoir. SET monitors changes in seismic energy emission due to micro-cracking, fluid wave resonance, fracture density and other reservoir perturbations induced by changes in stress state to generate data relating to mechanical properties of the formation, including permeability. Further description can be found in U.S. Pat. No. 7,127,353. As illustrated in FIG. 1, a seismic array is established (100) so as to acquire seismic energy data (120) from a change in fluid pressure in a reservoir (110).

"High Permeability Pathway" also called Active Fracture Image (AFI) refers to a portion of the geologic formation that has a permeability greater than that of the surrounding formation, for example, permeability that is at least one order of magnitude higher than the average permeability of the formation. High permeability pathways may correspond to naturally occurring features of the formation including fractures and faults.

"Voxel" refers to a three-dimensional volume that describes or corresponds to a specific position within three-dimensional space. Voxel may refer to data collected by a seismic array corresponding to a specific volume of a fluid reservoir. For example, a voxel may refer to semblance data or signals indicating permeability of the natural features of the fluid reservoir. Voxel may also refer to permeability data post-processing. A voxel may have both time and energy components wherein other data included in the voxel corresponds specifically to the time in which the data was acquired and the seismic energy emitted at that time. Voxels may be processed or analyzed by the various methods described herein.

"Pressure" refers to a measure of a force exhibited per unit area. A pressure may refer to a force exhibited by a gas or fluid per unit area. Pressure changes moving through a fluid, including a fluid trapped in a fluid reservoir may be referred to as a fluid pressure wave and may propagate through the reservoir over a given time period.

"Fluid Reservoir" refers to a geologic formation containing one or more fluids embedded or trapped within the formation. Fluid reservoirs may have naturally occurring permeability and porosity. Fluid reservoirs may contain hydrocarbons or molecules comprising primarily hydrogen and carbon, but may contain other elements, for example, oxygen, nitrogen, and sulfur. Hydrocarbons may refer to fluids targeted for recovery and production common in the oil and gas industry, including oil, natural gas, condensate and the like, but also include more complex molecules, such as naturally occurring polymers and paraffins.

Figure 2:
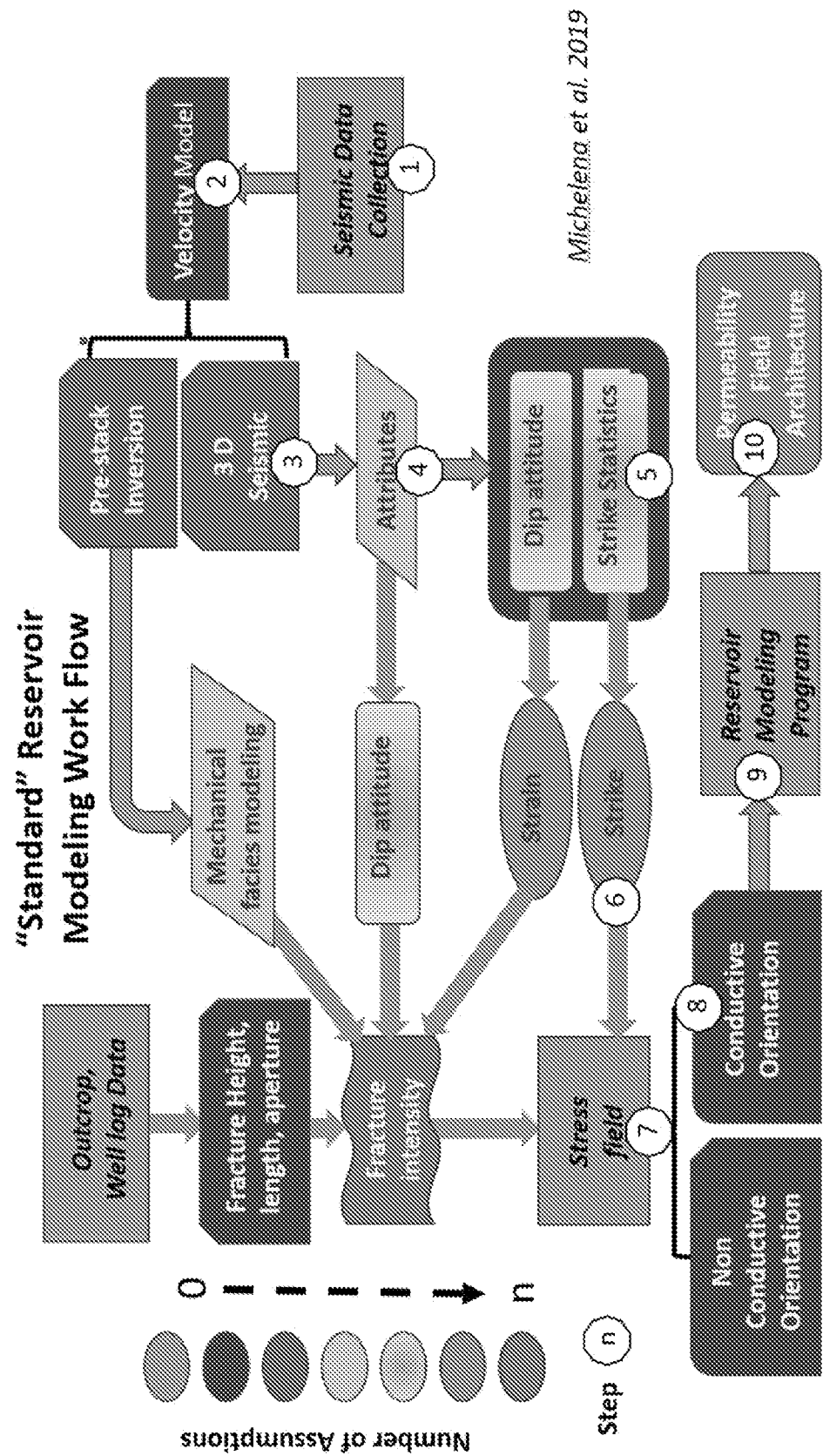
FIG. 2 is a flowchart describing a conventional method of generating a reservoir model, illustrating the added complexity over the method described herein (including in FIGS. 1 and 3). Notably, each step introduces additional uncertainty and error.

FIG. 2 provides an example of current ("conventional") reservoir modeling technology and illustrates the high complexity and large number of assumptions that lead to a high degree of uncertainty in the final model. Further descriptions of the steps within the process can be found in Michelena, R. J., et al; *Seismic, geologic, geomechanics, and dynamic constraints in flow models of unconventional fractured res-*

*ervoirs: Example from a south Texas field*; The Leading Edge, 38, 2, 116-122 (2019). As illustrated, some number of assumptions are introduced in each of steps: 2—Velocity model, 3—Pre-stack Inversion/3D Seismic, 4—Attributes, 8—Conductive and Non-Conductive Orientation, but notably steps 5—Dip Attitude/Strike Statistics, 6—Stain/Strike and the estimation of Fracture Intensity each introduce a large number of assumptions and, therefore, uncertainty.

Figure 3:
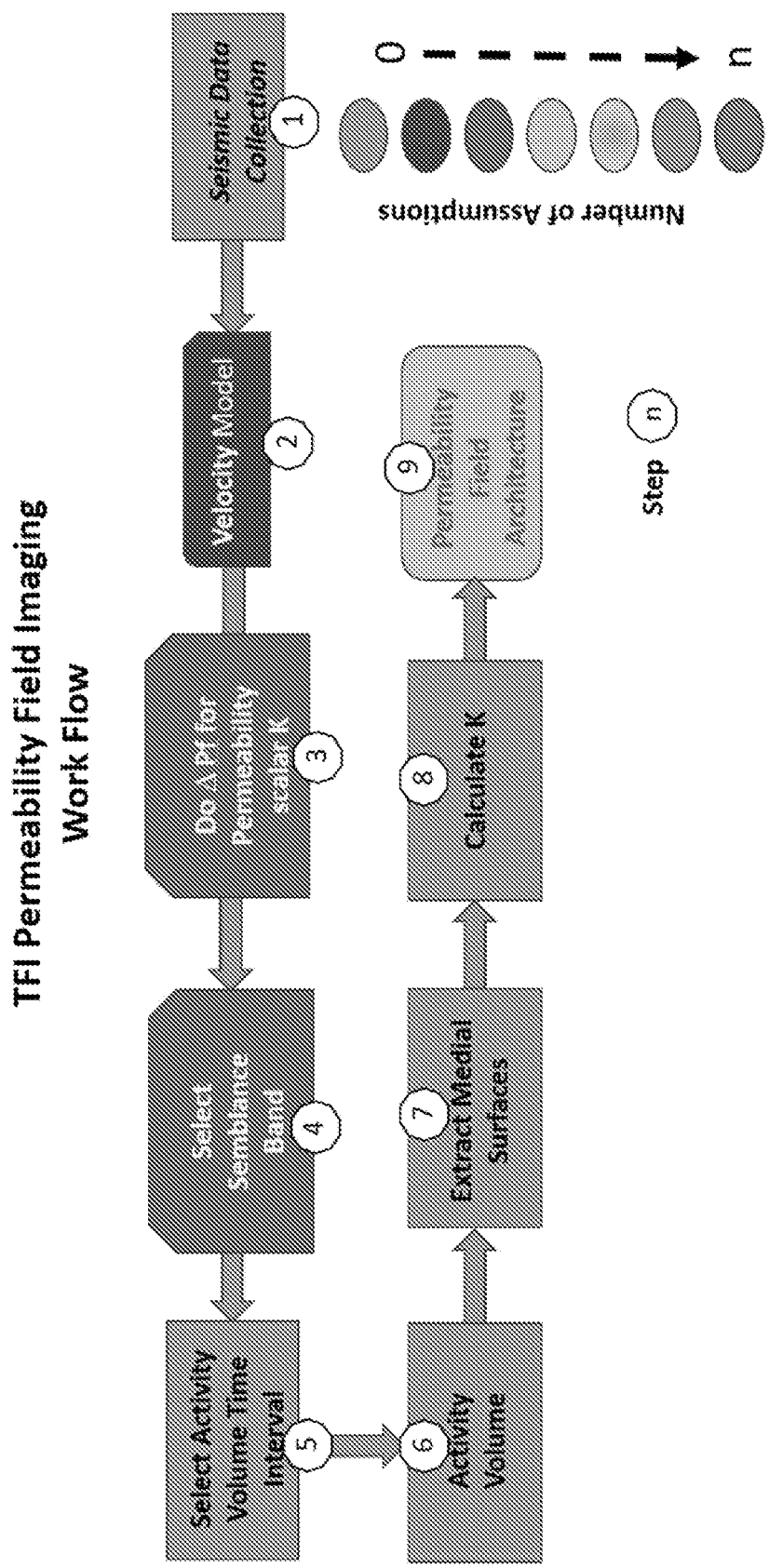
FIG. 3 is a flowchart of a method for determining a field permeability architecture as described herein, contrasting FIG. 2.

FIG. 3 provides an example flowchart of the methods for generating a field architecture described herein. In contrast to the complexity and large number of assumptions that are shown in FIG. 2, FIG. 3 shows only a few assumptions are necessary for steps 2—Velocity Model, 3—Determination of the permeability scalar (K) from the change in fluid pressure wave (as described in U.S. Pat. No. 10,145,227) and 4—Selection of the semblance band as a proxy for seismic energy within the formation. The elimination of the large number of steps and assumptions with regard to FIG. 2 result in a permeability architecture that is much more accurate and efficiently calculated than that provided by traditional reservoir modeling. This further allows the identification of high permeability pathways within the formation. The scale in each of FIGS. 1 and 2 represents the number of assumptions in each step. Steps 1 and 5-8 each have about zero assumptions, with the remaining steps having relatively few assumptions. Conventional modelling, as illustrated in FIG. 2, in contrast, has a much higher number of steps, with many of the steps each having a relatively large number of assumptions.

EXAMPLE 1

The Use of Tomographic Fracture Imaging (TFI) for Determining Reservoir Permeability Fields and Ambient Fracture Networks: a Comparison with Existing Methods The method described herein relates to the problem of providing accurate and precise spatial information on reservoir permeability field architecture for reservoir models. The Earth's brittle crust is a self-organizing critical (SOC) system. The permeability architecture created by the SOC system consists of highly heterogeneous permeability pathways. The size/frequency distribution of these pathways follows the Gutenberg-Richter (G-R) power law statistics resulting in a permeability field dominated by a few kilometer scale high permeability fracture/fault pathways. These large features lie on the numeric tail of the power law distribution however because they arise as a product of an SOC system their spatial locations cannot be predicted. Because they dominate the permeability field, their accurate and precise location is critical for permeability field modeling. Current methods for creating models of reservoir permeability fields rely on stochastic and heuristic methods which can neither reproduce the G-R frequency/size distribution or locate the actual principal fluid pathways. Due to the fundamental unpredictability of the Earth's reservoir permeability field, the only way to provide an accurate and precise mapping of this field is by directly imaging it and using these images as the basis for reservoir models. Both Tomographic Fracture Imaging (TFI) and Fracture Seismic Imaging use seismic emission tomography and either a skeletonization procedure or the Peak Picker tool to provide the surfaces of maximum permeability. These medial surfaces locate the high permeability pathways that form the architecture of the reservoir permeability field from the meter to kilometer scale. Depending on velocity model quality, measurement precision of as high as ±4 meters can be achieved. The extraction of the 3D medial surfaces and their inclusion in reservoir models provides the solution to the problem of the accurate location of the permeability field architecture. The complete permeability field can be obtained by applying finding the permeability scalar (K) (as described in U.S. Pat. No. 10,145,227) for the medial surfaces, and including it in the input to the reservoir model. Finally, high permeability pathways present in the reservoir due to the SOC nature of the formation may be identified as ideal targets for production.

The Earth's brittle crust contains subsurface fluid reservoirs. These reservoirs are an important natural resource for major components of humanity's economic system, e.g. oil, Gas, water. Another resource for which knowledge of the reservoir is critical are geothermal systems where the heated fluids are the source of the energy of the system. Once a fluid reservoir is discovered, it is necessary to create a development plan to maximize recovery of the resource. This is done by creating a reservoir model whose most critical component is the accurate and precise location of the reservoir permeability pathways which is also referred to as the permeability field "architecture". This model incorporating the permeability field architecture forms the basis for the location and drilling of development wells, production monitoring and enhanced recovery.

It is known that the permeability field is highly heterogeneous (e.g. Michelena et al, 2019). Accurate knowledge of the spatial distribution of the heterogeneity is critical for modeling permeability behavior, unfortunately as Odling et al, 2005 note: "The spatial distribution of faults is one of them most challenging characteristics to quantify and simulate and attempts to locate faults spatially rely on geometrical rules tested against natural patterns." The current solution to this problem is to use a variety of heuristic and stochastic methods including spatially random distributions, independent distributions and non-random spatial distributions of fracture/fault networks. According to Odling et al (2005) these can be classified as follows:

The "parent-daughter" model.
The "Frac Man" software which is a "nearest neighbor" model generating clusters of faults around larger faults.
The "war zone" model
A multiplicative cascade technique with random input from a Levy-stable distribution.

In addition, there are over 30 different modeling packages listed that use some variant of the above methods (http://petrofaq.org/wiki/List_of_Reservoir_Simulation_Software). Thus, the most critical element of the permeability field is dependent on heuristic and stochastic methods and not direct imaging of the permeability field. Testing of the modeling results is typically done by back-casting in which the model is adjusted to match production data. However, such solutions are non-unique and as a result cannot provide a high degree of confidence for use in reservoir management.

As noted by Odling et al (2005) the severe limitation on all of these methods, is determining the spatial distribution of faults/fractures that control the permeability. This limitation is imposed by the state of the Earth's brittle crust itself. As is now widely accepted e.g. Heffer (2005) the brittle crust is in a critical state and as such it is a Self-Organizing Critical (SOC) system. SOC is a characteristic of complex phenomena. Complex phenomena are emergent phenomena, i.e. it cannot be quantitatively determined how they arise from the physical mechanisms working at deeper levels. A theory of SOC can predict the specific statistics of a phenomenon in terms of probability but not actual outcomes. According to Bak (1996) the specific statistics are:

Occurrence of large catastrophic events;
$1/f$ noise.
Fractals
Zipf's law

In terms of permeability the relevant phenomena are rock failure events i.e. fractures, recorded as seismic events of various sizes. Consistent with the SOC behavior of the brittle crust, the size/frequency distribution of earthquakes and therefore fractures, follow a power law known as Gutenberg-Richter (G-R), where the largest fractures are least common and the smallest fractures the most common. We have shown that the largest fractures have the highest permeability and are responsible for most of the fluid production. This characteristic of the permeability field also can explain why 10% of wells provide 90% of the production.

While the power law describing the frequency/size distribution can be determined, the spatial location of the fracture/fault high permeability zones cannot be predicted. As a result, this essential property of the permeability architecture cannot be captured by any of the extent heuristic and/or stochastic modeling methods. Only direct imaging and mapping of the permeability field as input to a modeling packages can produce a reservoir model useful for development of the resource. As none of the existing methods for creating reservoir models are capable of providing accurate information on the critical spatial geometry of the reservoir permeability field it is desirous to have technology that can provide this information for input to reservoir models. This invention is to solve this critical problem that is a major impediment to creation of accurate reservoir models, namely accurate and precise information on the spatial organization of the reservoir permeability field architecture.

While it has been known since 1989 (Bak and Tang 1989, Sornette and Sornette, 1989) that the Earth's brittle crust is an SOC system and more recently that reservoir permeability fields are highly heterogeneous e.g. Odling et al, 2005; Michelena et al, 2019, the characteristics of the permeability field arising from the critical state of the Earth's crust and the limitations this imposes of modeling as discussed herein, have not been recognized. A further problem is that permeability is a function of fracture density. The greater the fracture density, the higher the permeability. Fractures and faults are embedded in "damage zones" consisting of a "cloud" of fractures that surround the region of highest strain and greatest fracture density. As shown by Vermilye and Scholz (1998) and Janssen et al (2001), fracture density increases geometrically as the medial surface of the damage zone is approached. Thus, the fracture density of the medial surface of the "damage" cloud is orders of magnitude higher than that of the entire cloud, represents the principal permeability pathway and is the most accurate and precise information on the permeability field architecture.

While Geiser (2006) suggested that the permeability field imaged via SET could be used for modeling, these images are of the damage zones associated with the fracture/fault permeability pathways. The largest fracture/fault pathways form the principal high permeability pathways. Their damage zones have widths on the order of 100 meters and too wide to provide accurate and precise mapping of the permeability field architecture. Thus, none of the foregoing methods for determining the architecture of reservoir permeability fields are adequate to provide accurate and precise information on the location of this fundamental component of reservoir models. Thus, it is desirous to develop systems and methods that can provide this information and thereby greatly improve the extraction of fluid resources from the Earth's brittle crust.

Reservoir modeling is critical to the production of fluid resources. Because all extent modeling methods are either heuristic or stochastic and do not recognize the following:

The fracture/fault systems of the brittle crust fluid that comprise the permeability architecture of the reservoirs follow G-R power law statistics That the crust is an SOC system and therefore it's development unpredictable, Consequently, none can provide accurate, precise location of the critical permeability field architecture. The present invention solves the problem of providing accurate and precise input of the spatial information on the permeability pathways of reservoir permeability fields for reservoir modeling applications. This is done by direct mapping of the reservoir architecture. The mapping method uses Seismic Emission Tomography techniques to image damage zones surrounding the high permeability pathways which are extracted from the damage zones via skeletonization.

The solution to the problem of the accuracy and precision of mapping the permeability pathways for input to reservoir models is found by:

Imaging of the permeability damage zones "clouds"

Location and mapping of the medial surface of the damage zone "clouds" by either skeletonization or use of the Peak Picker tool developed by Ambient Reservoir Monitoring, Inc.

The skeletonization method produces a medial surface with a thickness of one voxel. Depending on the quality of the velocity model, voxel size can be as small as 8 meters giving a location precision of ±4 meters. To create an accurate and precise reservoir model, the set of medial surfaces found by the preceding method are extracted from the volume in which the imaging was done and inserted into the reservoir model thereby removing one of the greatest impediments to creating accurate reservoir models namely the inability of existing methods to create accurate and precise representations of the permeability architecture. Further, by applying U.S. Pat. No. 10,145,227 to the damage zones, the permeability scalar K can be found and thus allowing the permeability field to be described in its entirety, including the identification of high permeability pathways.

References

Geiser, P., Lacazette, A., Vermilye, J. 2012. Beyond "dots in a box": an empirical view of reservoir permeability with tomographic fracture imaging, First Break, 30, 63-69.

Michelena, R. J., Gilman, J. R. and Zahm, C. K., 2019; Seismic, geologic, geomechanics, and dynamic constraints in flow models of unconventional fractured reservoirs: Example from a south Texas field; The Leading Edge, 38, 2, 116-122.

Odling, N. E., Harris, S. D., Vaszi, A. Z. and Knipe, R. J., 2005, Properties of fault damage zones in siliclastic rocks: a modelling approach; in Shaw R. P. (ed.) 2005. Understanding the Micro to Macro Behavior of Rock Fluid Systems, Geol. Soc. London, Spec. Publication 249, 43-59.

Heffer, K. J., 2005. The NERC Micro to Macro Programme: Implications for fluid reservoir management, in Shaw R. P. (ed.) 2005. Understanding the Micro to Macro Behavior of Rock Fluid Systems, Geol. Soc. London, Spec. Publication 249.

P. Bak, 1996, How nature works. Springer-Verlag New York, Inc. 212.

Bak, P. and Tang, C., 1989, Earthquakes as self-organizing critical phenomena; Journal of Geophysical Research, B94, 15635.

Sornette, A. and Sornette, D., 1989, Self-Organized Criticality and Earthquakes, Euro-physics Letters, 9, 197.

Vermilye, J. M. and Scholz, C. H. [1998] The process zone: A microstructural view of fault growth. J. Geophys. Res—Solid Earth 103, 2223-12237.

Janssen, C., Wagner, F. C., Zang, A. and Dresen, G. [2001] Fracture Process zone in granite: a microstructural analysis. Int. J. Earth Sciences (Geol. Rundschau); 90, 46-59.

EXAMPLE 2

Fracture Seismic Imaging (FSI) Directly Images the Reservoir Permeability Field

Over the last 50 years or so, two major discoveries have greatly enhanced our understanding of the permeability field of the Earth's brittle crust:

(i) The ubiquitous association of joint controlled pressure solution with both the lithification and deformation processes e.g. Robin, 1978; Geiser, 1974; Geiser and Engelder, 1983; Alvarez et al 1983, etc. has demonstrated that the fundamental element for fluid movement and deformation processes of the Earth Brittle crust are fractures of all scales rather than faults; and (ii) The Earth's brittle crust is in a critical state (Per Bak, 1996., Leary, 1997) Recognition of this has allowed Malin et al, (2020 in press) to develop analytic solutions for the development of the critical crust permeability field from a first principal basis. One of the most important attributes of their theory is that it is consistent with the behavior of critical state systems, in particular it is a Self-Organizing Critical (SOC) system (Per Bak, 1996) whose suggested mechanism is scale independent.

The permeability field was first imaged via Tomographic Fracture Imaging (TFI: Geiser et al, 2006, 2012) which used Seismic Emission Tomography (SET) and semblance for this purpose. Due to recent major improvements in processing of the seismic data for SET and the semblance field (Sicking and Malin, 2009), TFI has been replaced by Fracture Seismic Imaging (FSI). Both TFI and FSI directly image the permeability field of the brittle crust via the same set of phenomena that arise from the critical state of the Earth's brittle crust (Geiser et al, 2006, 2012). This example permits a much deeper understanding of the crustal permeability field imaged by both TFI and FSI and suggests a new and comprehensive model for fluid reservoir permeability fields.

The analytic key used to deduce this model is to approach the problem by explicitly identifying the pathways that allow fluids to both enter and exit the heterogeneous fabric elements of the geocritical permeability field of sedimentary basins. Although the focus is on sedimentary basins the model is generally applicable to all low temperature non-metamorphic environments including orogenic belts and offers a "jumping off" place for investigating the permeability field of metamorphic terrane.

Permeability Field Fabric Elements: two classes of permeability fabric elements are recognized: 1) Individual fractures whose size range from the micro to meso-scale; 2) High permeability "zones" which form discrete volumes and whose size is at the macro (Km) scale. They are divided into two types (Type 1 and Type 2) based on the resolution of FSI.

Figure 4:
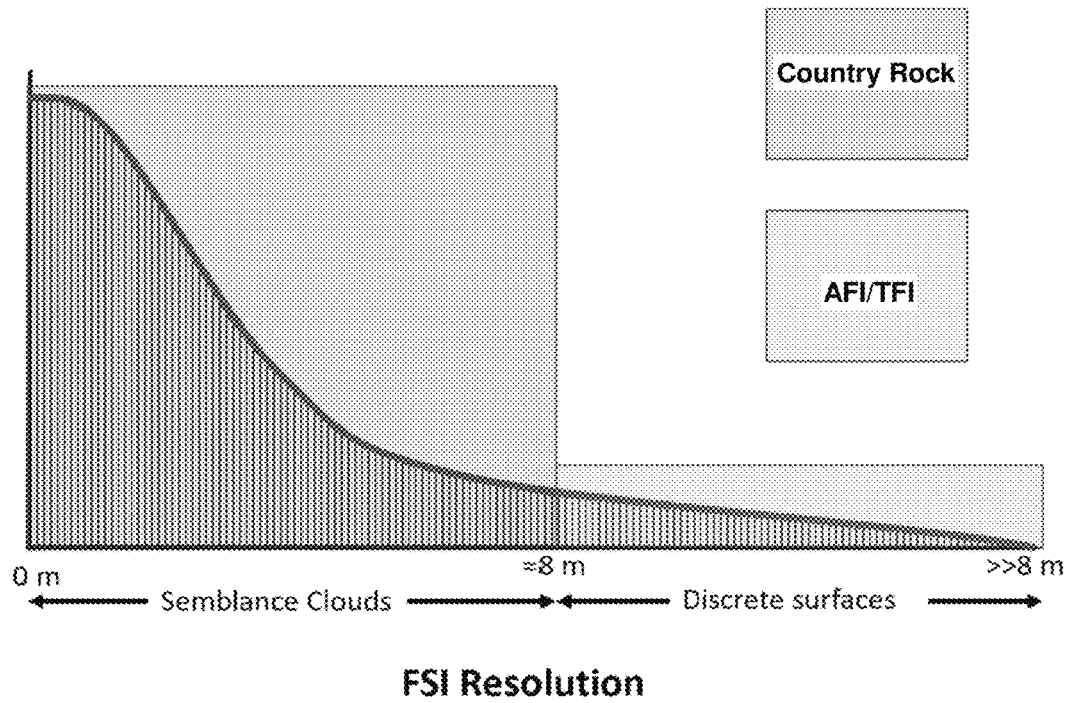
FIG. 4 is a frequency plot of Country Rock fracture sizes (between $1 \times 10^{-6}$ m and 8 m) v. AFI (greater than 8 m in length) in terms of voxel resolution.

Type 1 (Semblance Clouds): Type 1 permeability fabric elements are posited to consist largely of fractures and small faults that are below the resolution of FSI and hypo-central methods (FIG. 4). They form the bulk of the fractures of the power law/size frequency distribution characteristic of the Earth's brittle crust, e.g., Marrett et al, 1999, Malin et al, 2020. The Type 1 "Semblance Clouds" are referred herein as "Country rock". Because the permeability flow paths follow Gutenberg-Richter (GR), the most numerous paths are millimeter to micro-meter scale fractures. The orientation of these fractures is largely controlled by elastic strains "locked" into the crystal lattices of the grains and their cement that were accumulated during the rock loading history (Engelder and Geiser)

Figure 5:
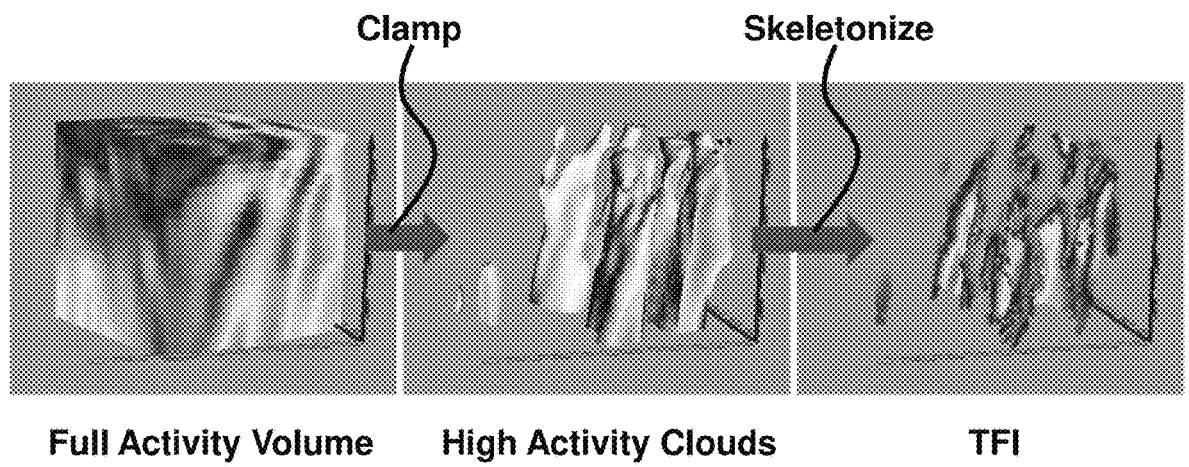
FIG. 5 is a work flow representation for extracting TFI media surfaces of HAC.

Type 2: Type 2 permeability fabric elements are embedded in the "Country Rock". They are surfaces of a single voxel in thickness that are either the medial surface of High Activity Clouds (HAC FIG. 5) called Tomographic Fracture Images (TFI) or the surface of maximum semblance value embedded within the HAC called Active Fracture Images (AFI) of FSI. TFI and AFI are essentially identical in properties i.e. they are both one voxel in thickness and represent regions of maximum fluid volume, but AFI are the result of a more objective processing and thus are considered more accurate in terms of location and properties. AFI/TFI are surrounded by closed ellipsoidal iso-surface volumes large enough to be imaged by FSI/TFI and lie on the "tail" of the power law size/frequency distribution (FIG. 4). Both micro-seismic and reflection seismic data indicates that Type 2 fabric Elements are primarily fracture zones.

Permeability Field Energetic Phenomena:

The following types of phenomena are currently recognized as making up the total energetic components of the GeoCritical Reservoir permeability field:

Fluid Pressure (Pf) waves created by rapid fluctuations in Pf associated with both production and fracing. The Pf wave has soliton like properties and propagates at rates on the order of 10s of meters/sec. This wave appears to be restricted to the AFI i.e., the regions of highest fluid content. (Geiser et al, 2006)

Krauklis waves generated by resonance of the walls of fluid filled fractures. The energy creating the resonance may be provided by any or all of the following: Pf waves; fluid flow. (Tarry et al, 2014 a, b); Fluctuation of the ambient stress field.

Bulk fluid Flow measured in mD created by the connectivity of country rock fractures/faults with sizes≤8 m to 10 m with flow rates on the order of $10^{-1}$ to $10^{-2}$ m$^2$/sec. (Shapiro, 2008, Angus and Verdon, 2012)

Induced Seismic waves generated by fracking and production.

Ambient Seismic waves generated by natural phenomena, e.g. teleseismic, waves in bodies of water, etc. (Geiser et al, 2006).

Ambient Stress waves generated by natural phenomena, e.g. Earth tides, air mass movement, etc. (Geiser et al, 2006).

Data Supporting the Full Activity Volume as a 5D Map of the Reservoir Permeability Field:

The following is an outline and summary of the evidence that the semblance field and AFI provide a 5D mapping of the reservoir permeability field. Although the evidence is from a non-orogenic basin, the model is general and applies to all geologic environments above the brittle/ductile transition. The following further discusses the evidence supporting the instant model.

Figure 6:
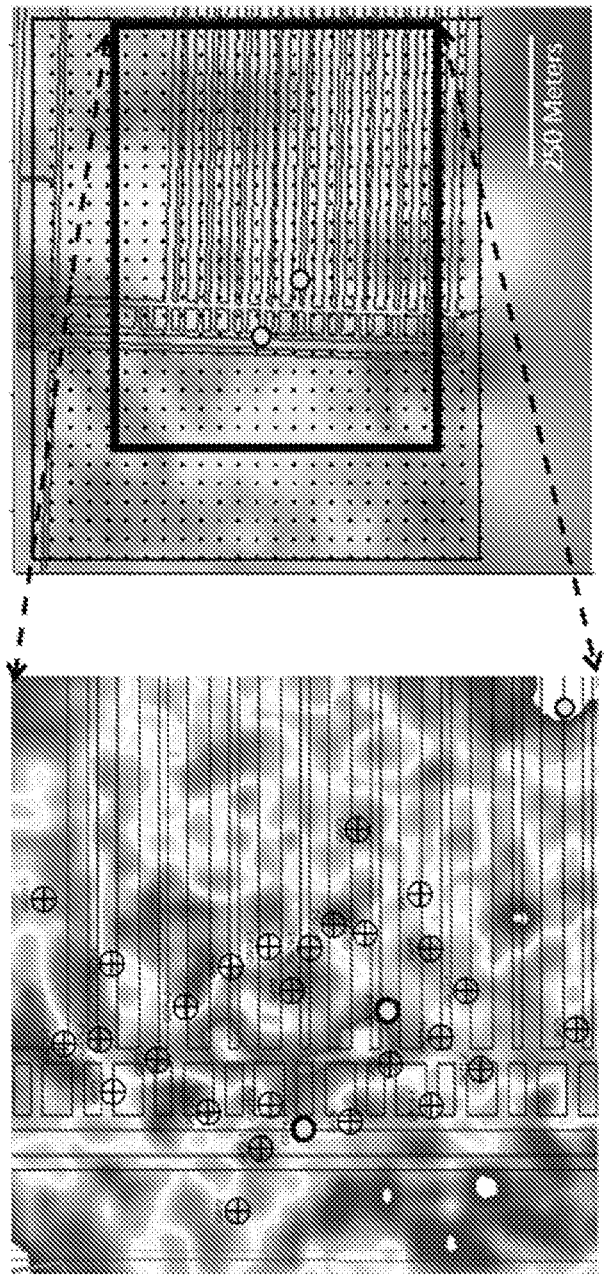
FIG. 6 is a comparison of 4D Seismic (left panel) and semblance data (right panel) from mine inflow site. The data are superposed on the mine workings. Note an almost 1:1 correspondence between region of high semblance value and location of fluids indicated by 4D seismic data.

Fluid Pathways and Semblance Iso-Surfaces: The Relation of Set Semblance to the Fluid Content of Rock:

Fundamental to an understanding of the reservoir permeability field is the recognition that the semblance value generated by FSI has a functional correspondence to the fluid content of the rock. FIG. 6 compares 4D seismic data known to correspond to the location of fluids, to the same area but imaged with SET Semblance (SS) (because Semblance is a generic term, the expression SET Semblance (SS) is used to specify its type). FIG. 6 shows that the semblance maps the location of fluid and that there is a proportionality (there are a number of parameters that affect the SS value, e.g. crack density, rock strength, etc.; consequently present knowledge of the exact relationship between the fluid content and the SS value is expressed as being proportional) between the SS value and fluid content where the higher the fluid content the higher the SS value. The images map the location of fluids at an inflow site in a Potash mine. The semblance data was procured about 9 months after the initial inflow had been reduced by about 90%. The data show a close correspondence between the location of the fluid and the regions of high SS values.

Figure 7:
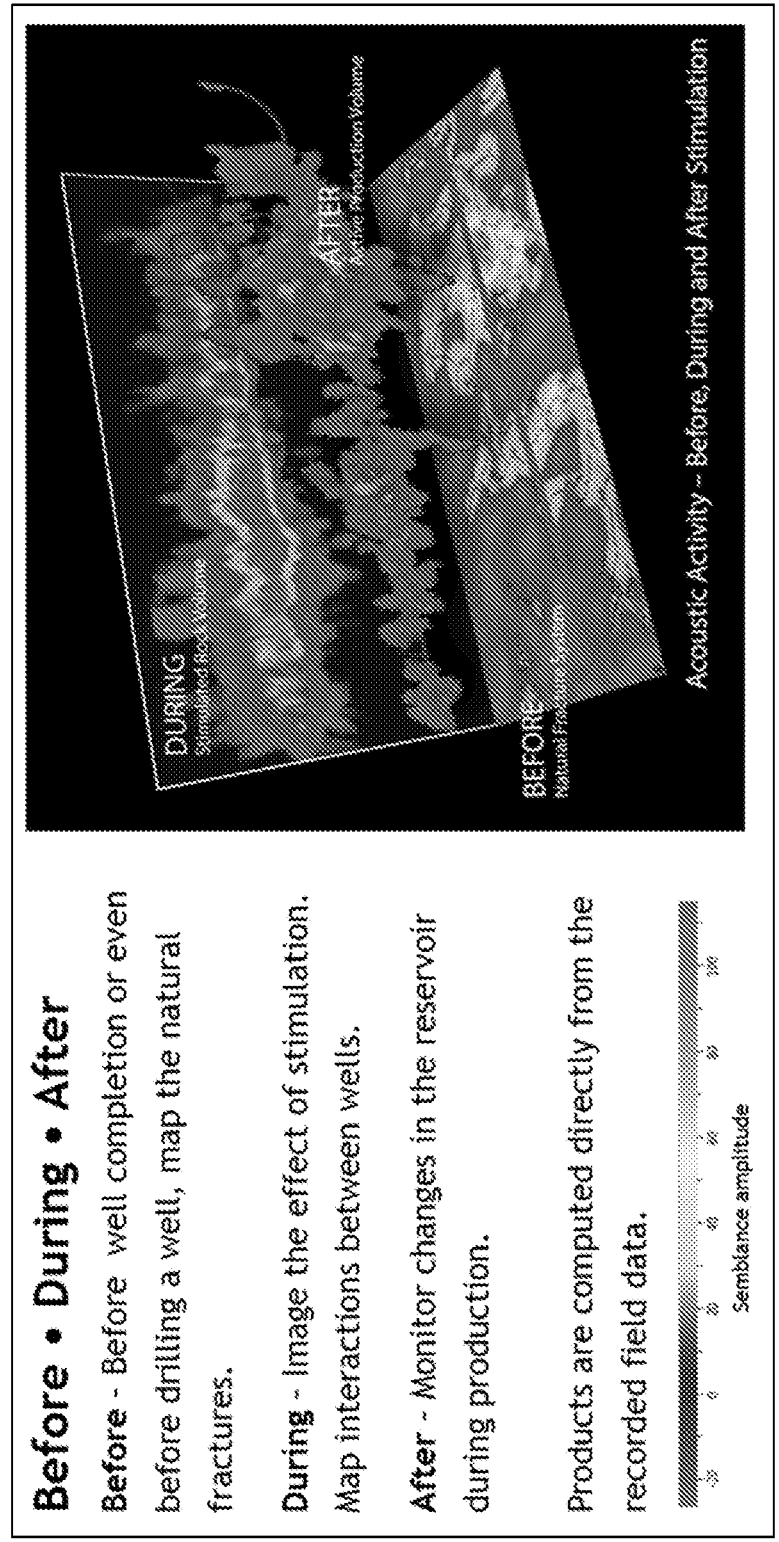
FIG. 7: Composite image showing relationship between semblance and fluid locations before, during and after fracking (courtesy ARM).

FIG. 7 is a further example of the relationship between SS and fluid content. The BEFORE is a map slice through a Full Activity Volume semblance clouds and AFI (Type 2 fabric elements). The map shows the location of Reservoir Scale (RS) AFI/TFI and their reservoir fluid (yellow and red SS). The DURING image is a vertical slice through the semblance volume activated during the frac, showing the location of fluids injected during fracking. The AFTER image is a projection of a 3D volume. It is situated above the BEFORE map to show that the location of the fluids activated by production have a 1:1 correspondence between the BEFORE and AFTER locations such that the maximum fluid production is where the well intersected the RS AFI/TFI. Thus the Type 2 fabric elements are the regions of maximum fluid content. Note the vertical orientation of the maximum length and the very high aspect ratio of the roughly ellipsoidal HAC of the "AFTER" volumes shown in FIG. 7. As will be shown these are the geometric characteristics of the iso-surfaces surrounding an AFI/TFI.

Figure 8:
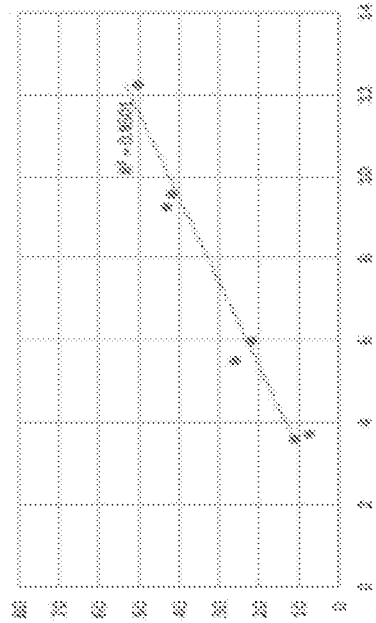
FIG. 8: Production v. high relative semblance voxels/foot of well length in the Bakken Field first 140 days (left panel) and the Eagleford Field day 30 (right panel).
Figure 8:
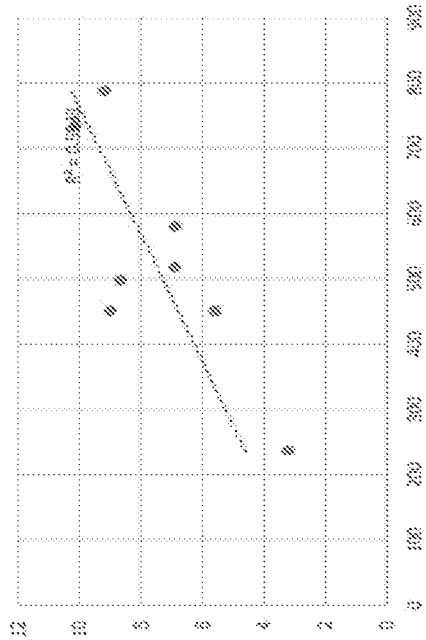
Figure 9:
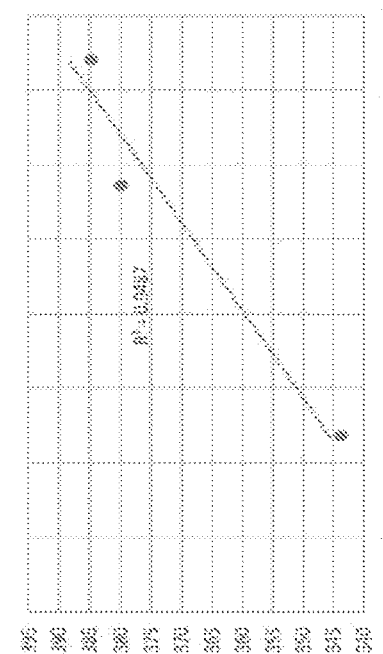
FIG. 9: Production v. high relative semblance voxels/foot of well length in the Eagleford Field first 192 days (left panel) and the Marcellus Field day 30 (right panel).
Figure 9:
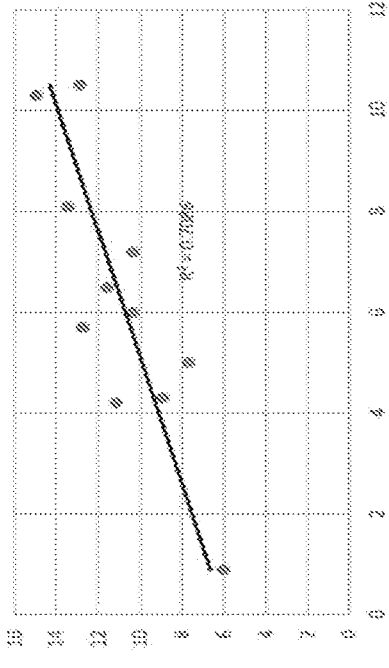

Relationship Between Voxels and Permeability:

The fundamental imaging unit of FSI is the three-dimensional pixel or voxel. We have shown that both fracture density and fluid content bare a proportional functionality to the SS value, i.e. the higher the value of these two parameters, the higher the SS value. Although we do not have the functional relationship between these parameters and the SS value, both parameters relate to permeability. The evidence for this is given by the following set of plots, FIG. 8 and FIG. 9 (courtesy of Laird Thompson (personal communication, 2020)) illustrates the relationship between the number of Near Well Active (NWA) voxels and production. Production requires permeability. The data show that the number of NWA voxels is directly proportional to the production, i.e. the greater the number of NWA voxels/foot of well length, the greater the production. The work flow for finding the NWA voxels selects for a set of voxels that are connected to the well and have relatively high semblance. Although not an independent parameter as it is a function of crack density and fluid volume, it is reasonable to conclude from the foregoing that that fluid permeability is a parameter reflected by the voxel SS value.

SS Iso-Surfaces

Figure 10:
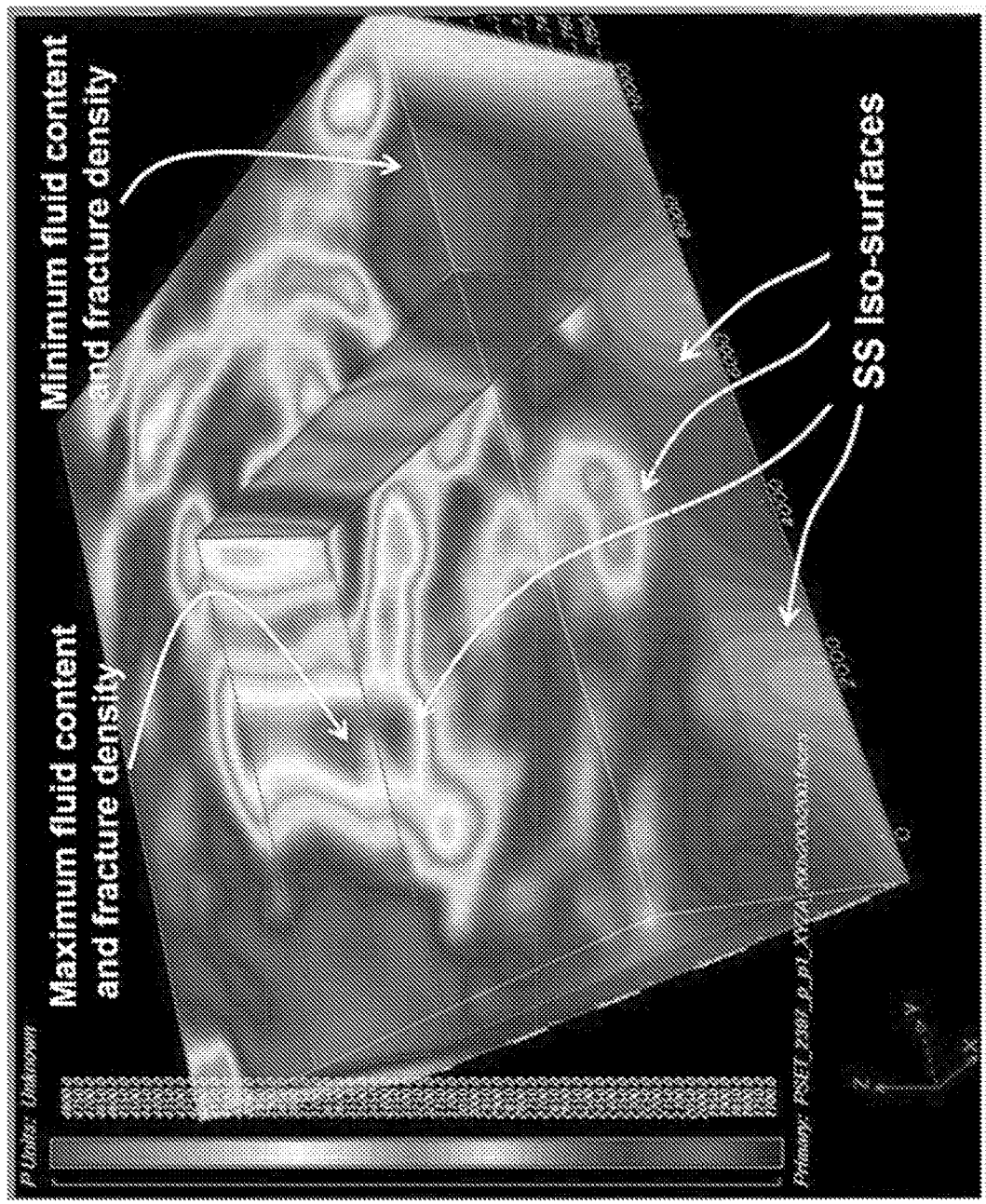
FIG. 10: Barnett Shale "chair-cut" of Full Activity SS volume showing how SS Iso-surfaces fill the volume.
Figure 11:
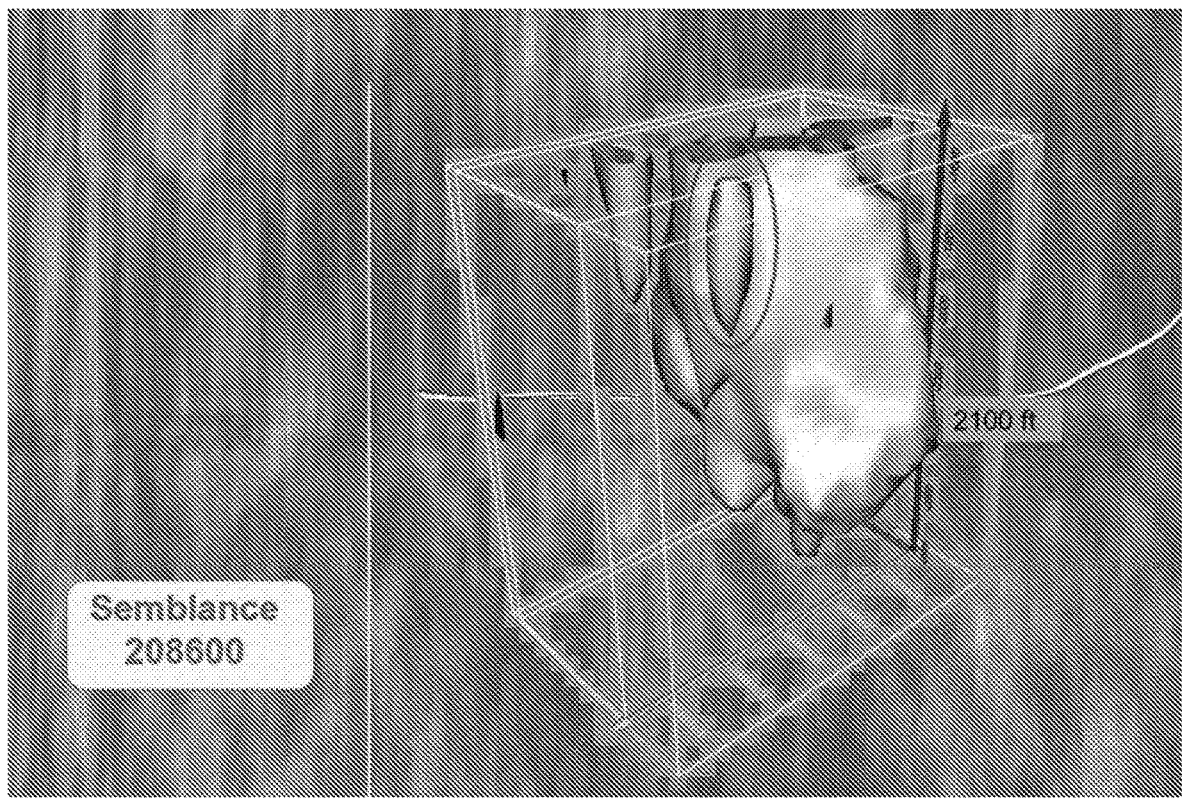
FIG. 11: 3D projection of iso-surface with SS value of 208600.
Figure 12:
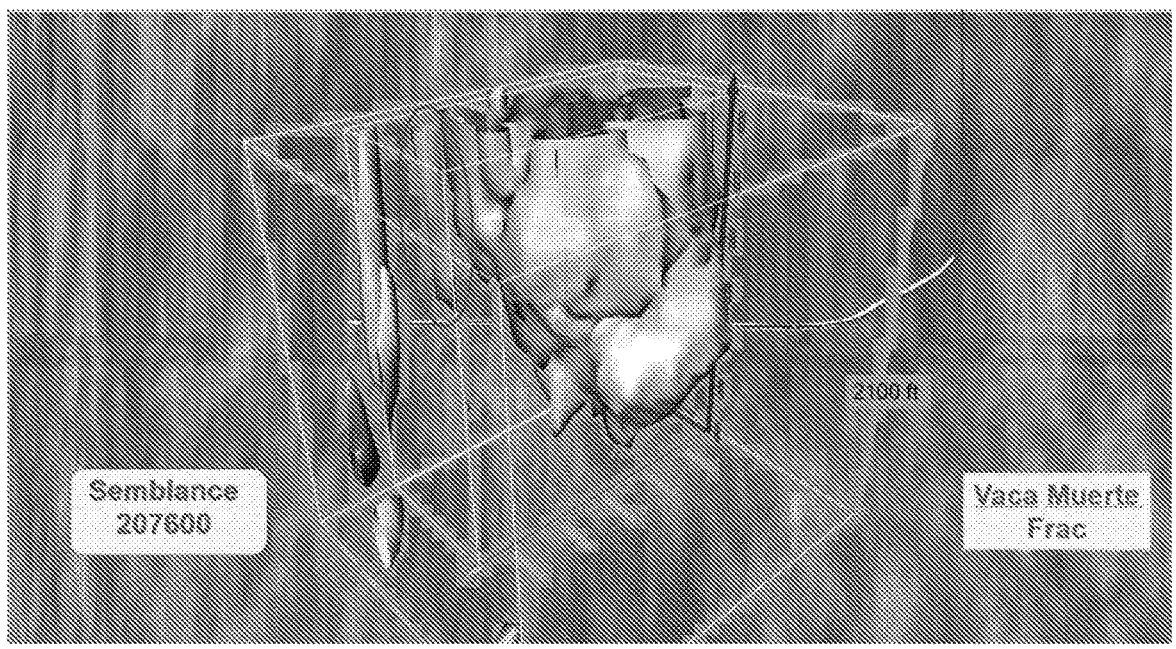
FIG. 12: 3D projection of iso-surface with SS value of 207600. Note the appearance of closed vertical high aspect ratio ellipsoids (circled in red) indicating the presence of AFI/TFI with lower SS value than those appearing at of higher SS value.
Figure 13:
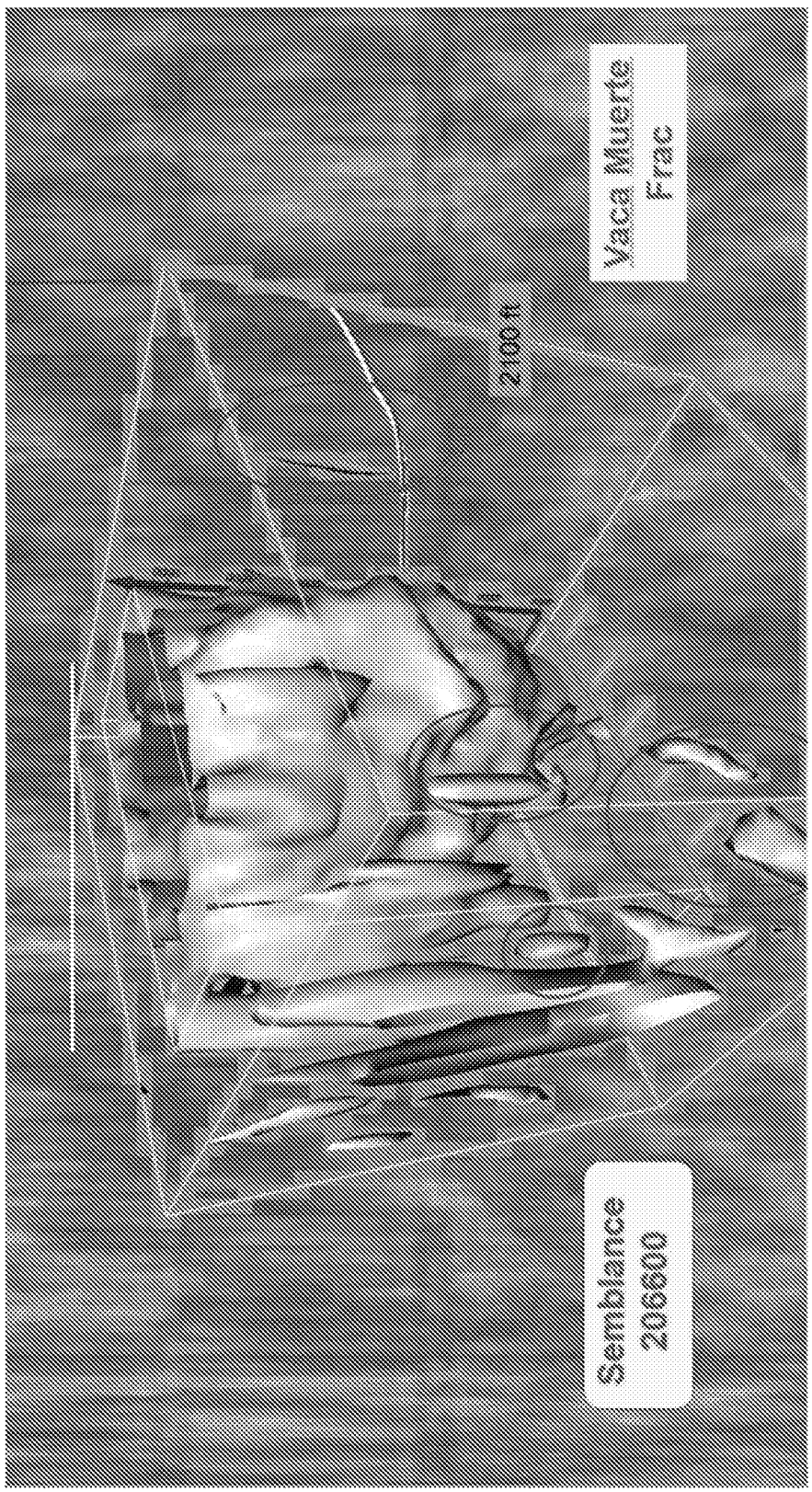
FIG. 13: 3D projection of iso-surface with SS value of 206600 from a Vaca Muerte frac. Note the appearance of closed vertical high aspect ratio ellipsoids (circled in red) indicating presence of AFI/TFI with lower SS value than those appearing at higher SS.

SS Iso-surfaces are surfaces with the same SS value. They both fill the volume and form closed ellipsoidal volumes about the AFI/TFI, the regions of highest fluid content. FIG. 10 is a Full Activity Volume showing both iso-surfaces and the outward diminution of SS value from regions of maximum SS value. FIGS. 11-13 show a series of iso-surfaces with successively lower SS value extracted from a Full Activity Volume from a frac in the Muerta Vaca formation in Argentina. They show both the high aspect ratio vertical ellipsoidal volumes that surround AFI/TFI and the systematic enlargement of the iso-surface outward as the SS value diminishes. The changing number of the AFI/TFI HAC ellipsoids reflects the presence of AFI/TFI with lower SS values.

Three important observations about FIGS. 11-13:
1) The Full Activity Volume is filled by iso-surfaces rather than other possible voxel distributions, e.g. randomly scattered high SS value voxels.
2) The iso-surface SS value systematically decreases away from the Type 2 fabric elements of maximum fluid content.
3) The number of AFI/TFI imaged depends on the SS value, i.e. there are AFI/TFI that are expressed across the entire spectrum of SS values.

Of the three parameters recognized as having a proportional relationship to the SS value i.e., 1] fracture density; 2] Fluid volume; 3] Rock strength, only the fluid content can be reasonably expected to change in a systematic fashion. Thus, the outward diminution in iso-surface value is consistent with the fluid content per voxel diminishing away from the region of maximum fluid content, the AFI/TFI, because the same amount of fluid occupies a larger and larger volume.

Determining the Permeability of the GeoCritical Reservoir:

As noted, the GeoCritical Reservoir permeability field comprises two components; 1] The high fluid content AFI/TFI; 2] The "Country Rock in which the AFI/TFI are embedded. As noted, the AFI/TFI are regions of the reservoir with maximal fluid concentrated into fracture/fault zones, whereas based on the previous section, the systematic variation in the semblance field of the country rock is a function of fluid moving through more diffuse permeable material. This suggests that there are different means for measuring the permeability of the two permeability field components. This section discusses the evidence for both volumetric flow of fluids through the country rock and that it has a measurable permeability.

Determining the AFI/TFI Permeability: The AFI/TFI are the "Flow Channels" of Malin et al (2020). The flow channels are regions of maximum permeability. Although prior to the advent of TFI and FSI, there was almost nothing known about the permeability field architecture there was considerable anecdotal evidence for fast pressure transmission in terms of linked well production changes occurring over distances of kilometers within a matter of hours or less. The first documented evidence for such rapid responses was noted during the Rangely experiment. Raleigh et al, (1976) noted that micro-earthquake activity at distances of up to 4 km from their injection site, stopped within 4 hours of shut-in.

Similar although inverse events, i.e. an increase in production, was noted by Heffer et al (1995) in their study of "rate correlation statistics" for several oil fields. In this case it was noted that similar to the Rangely case in terms of time and distance, production wells would rapidly respond to injection wells at distances of up to 5 km. Although the exact response time is lacking because production changes were only logged on a daily basis, it was within a manner of hours or less. The rapid response was attributed to a cascade of elastic failures produced by the injectors.

Figure 14:
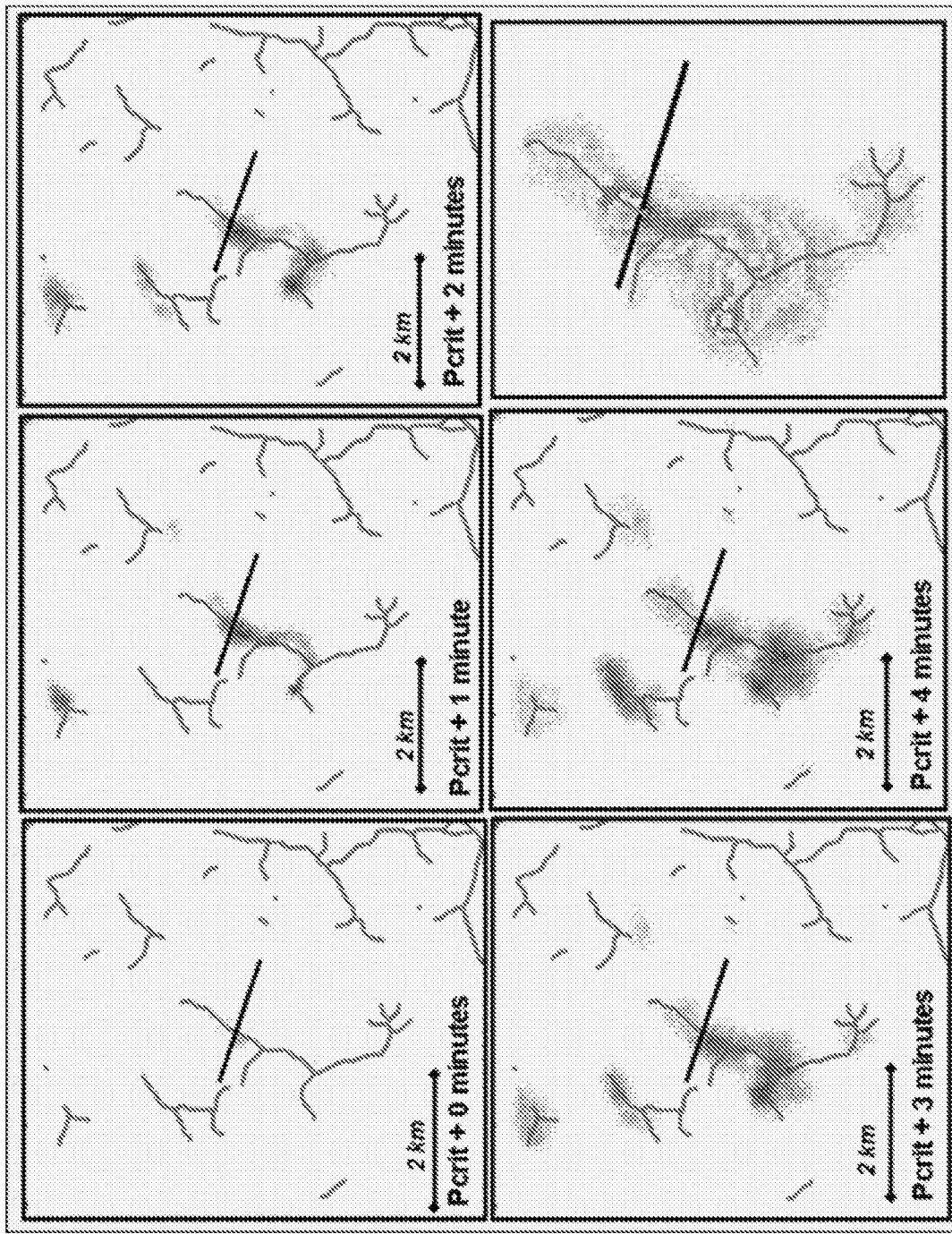
FIG. 14: Successive 1 minute map slices of a SS volume showing the migration of seismic activity induced by fluid pressure changes along a TFI intersected by the treatment well. The red angular lines are the TFI. The treatment well is the WNW-ESE trending black line.

The first actual documentation and rate determination was made on a Barnett frac by Geiser et al (2006). FIG. 14 shows the migration along a TFI of what is interpreted as a fluid pressure (Pf) wave created by the frac. The wave moved over 3 km with a velocity of about 17 m/s. The very slow attenuation suggests soliton like properties (C. Archambeau, personal communication, 2000).

Hilpert et al (2018) using a formulation of the Biot (1962) slow wave derived a method for calculating the permeability from the Pf wave velocity. Calculation of the permeability from the Pf wave requires capturing SS high activity cloud from the moment that the BHP reaches Pcrit (FIG. 14, upper left hand panel). The creation of a Pf wave is a response to any change in fluid pressure, either positive or negative, i.e. a Pf wave can be created by either any rapid change in fluid pressure, positive or negative. Evidence for a Pf wave negative pressure change was noted in response to the start of production in a Colombian oil field (C. Archambeau, personal communication, 1998). To date clearly identifiable Pf waves seem restricted to the AFI/TFI. It is unclear whether this is for observational or physical reasons.

Determining the Country Rock Permeability: The "Pressure Diffusion" Method:

Given that there is no REV, it raises the question of whether or not there is any means at all for measuring of the Country Rock permeability? As noted by Malin et al, (2020), the permeability is a function of the quality and number of connections between "pores" i.e. the higher the number of connections, the more and better the connections, the higher the permeability. The implication being that the larger the volume the higher the permeability. Thus, in a sense the permeability increases indefinitely with size because as the measured volume increases it also will capture the AFI/TFI or "backbone" elements whose permeability is orders of magnitude greater than that of the country rock but whose frequency is on the power law tail (FIG. 4). That said, for any given lithologic unit of similar properties, if we exclude the AFI/TFI, there may be a volume size within any given lithologic unit where the permeability approaches a limit.

A suggestion that this is so is given by the work of Shapiro (2008), Shapiro and Dinske (2009) and Angus and Verdon (2012). Those workers have developed micro-seismic methods that may approach the sample size criteria for determining the "country" rock permeability. Shapiro (2008) used the fit of what he calls the "triggering front" and "triggering back" to estimate what he calls "hydraulic diffusivity".

Figure 15:
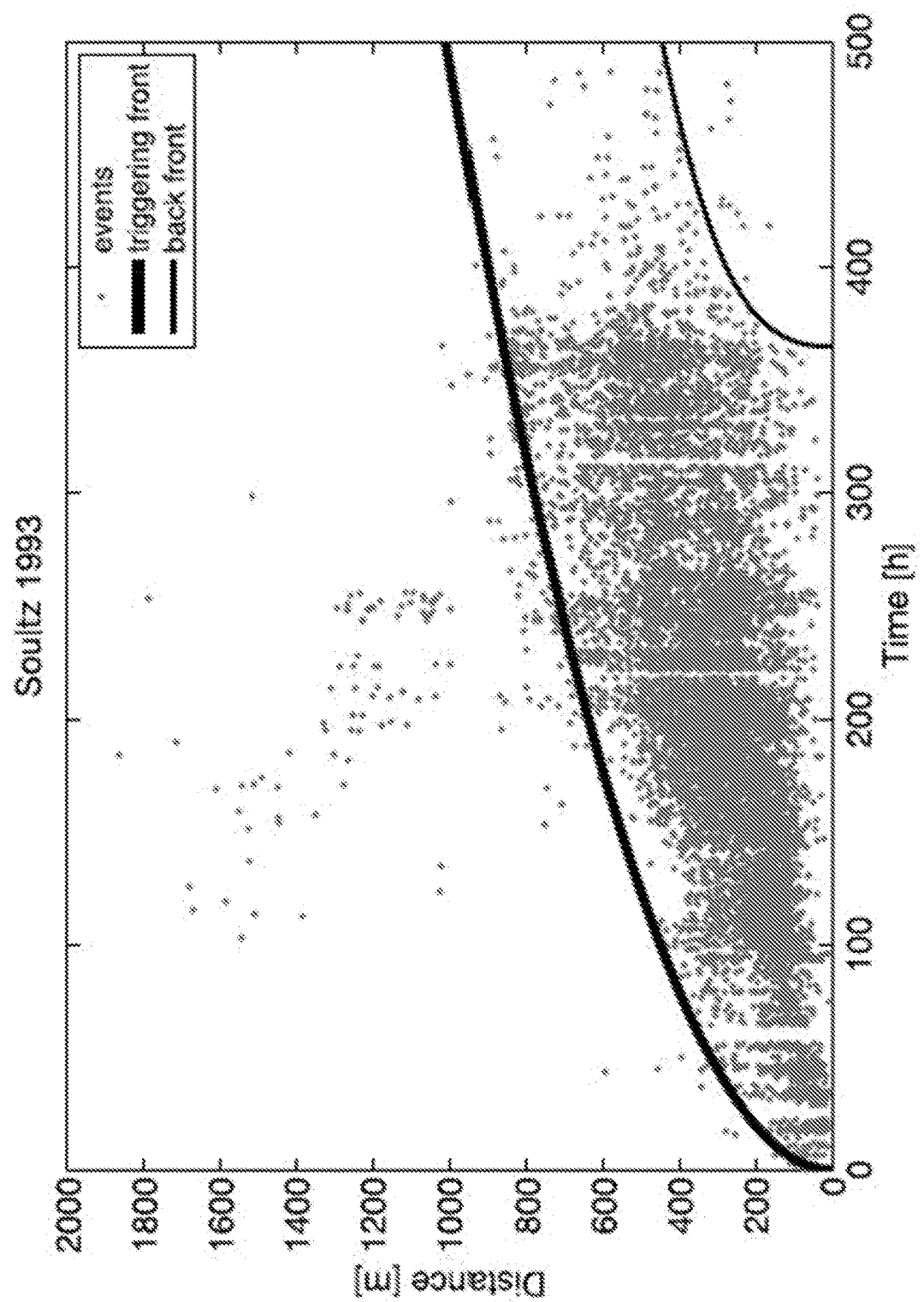
FIG. 15: Induced micro-seismic events at Soulze fit to triggering front and back (from Shapiro and Dinske 2009).

As FIG. 15 shows, the volume in which the induced events were measured is at the 100 meter scale, i.e. a volume that may be large enough to approach the limit for the permeability. The data shows 500 hours of the progressive migration of micro-seismicity away from the site where fluid was injected. The "diffusivity" of the Soulze data is 0.05 $m^2$/s. Using this same technique, Shapiro (2008) gets a rate of 0.17 $m^2$/s for Fenton Hills.

Although Shapiro refers to the results as a measure of "diffusivity" the rates calculated are orders of magnitude greater than those associated with diffusional rock processes at temperatures typical of reservoirs and orogenic forelands i.e. <200° C. Instead it is reasonable to posit that those rates represent bulk flow rather than "diffusion".

Angus and Verdon (2012) in a study of water and $CO_2$ injection in a vertical well located in a tight gas reservoir, use Shapiro's method to estimate formation permeability from the induced micro-seismicity. The "diffusion" values are from a cloud of micro-seismicity whose length and width are 220 m×70 m, i.e. a sample size that may be sufficient to capture the country rock fracture size range. The calculated values range from 1.25 m²/s to 0.10 m²/s, which they use to determine the permeability K itself in mD. For the water-gel they calculate K values that range from 34.07-106.48 mD and for the $CO_2$, K ranges from 14.54-58.15 mD.

While those data are for what Angus and Verdon (2012) call enhanced permeability resulting from the frac, without the use of FSI to confirm that the data truly reflect new fractures and not pre-existing ones, such a claim cannot be verified. In addition, those data represent fluid flow under a pressure differential not normally present. That said, given a sufficient driving force such as those associated with metamorphic driven dewatering, those relatively high rates of bulk flow that are at least potentially possible can account for the rapid volume loss during orogenesis. In other words, the permeability available may be higher than that derived from samples that are far too small to encompass the full range of fracture sizes that constitute the country rock.

Evidence for Volumetric Flow—The Volume Loss Problem: A major problem in structural geology is that finite strain studies, e.g. Alvarez et al, 1978; Wright and Platt, 1982; Geiser and Engelder, 1983, have consistently shown evidence for large volume loss associated with orogenic activity. This loss varies from the more than 50% documented by Wright and Platt for parts of the Martinsburg formation in the Great Valley to the average of about 10%-15% found by Alvarez et al. (1978) for the Apennines and Geiser and Engelder (1983) as well as others for the Appalachians e.g. Marshak and Engelder, 1985, Geiser and Sansone, 1981. Erslev. (1998) presents evidence that for some slates, including part of the Martinsburg, subject to low-grade metamorphism there is no chemical difference between the nonvolatile elements of the protolith and the slate thereby inferring no volume loss. He suggests that the contradiction between the geochemical evidence and finite strain data "may lie in over-extrapolation of geometric methods used to calculate volume losses;" unfortunately he neither explains or pursues this hypothesis further. The problem is threefold: source, sink and flow rate.

Source: The source for the solute during orogenesis, is the widespread development of layer parallel shortening due to solution cleavage and grain scale dissolution. These processes result in the widespread volume loss. Solution cleavage and grain scale dissolution are found in virtually every mountain belt. Where studied it is found to be preceded by an episode of non-volatile volume loss normal to bedding during lithification. The material lost during this event is inferred to be responsible for the primary cementation of the stratigraphic units. Since primary and/or secondary bedding cementation occurs prior to the volume loss associated with bedding parallel shortening during orogenesis, this sink is not available for the volume loss associated with orogenesis.

Sink: Given the large volumes of solute that are missing, the sinks should be readily apparent. Literally decades of searching by a number of structural geologists for the solute sink for the rock volume lost during orogenesis has been unsuccessful. As a result, it has been concluded that the sink for solute/solvent mixture is the sea. This leaves the problem of finding the conduits for the transport of the missing material out of the orogenic system.

Flow Rate: Two observations indicate that the flow must have been Darcyian rather than diffusion. These are: (1) The evidence for many mountain belts (if not all) is that the orogenic pressure solution activity occurred at temperatures of $<\approx 200°$ C. and occurred over periods only a few million years; (2) Because of the very low atomic diffusion rates at these temperatures, atomic diffusion is eliminated.

Figure 16:
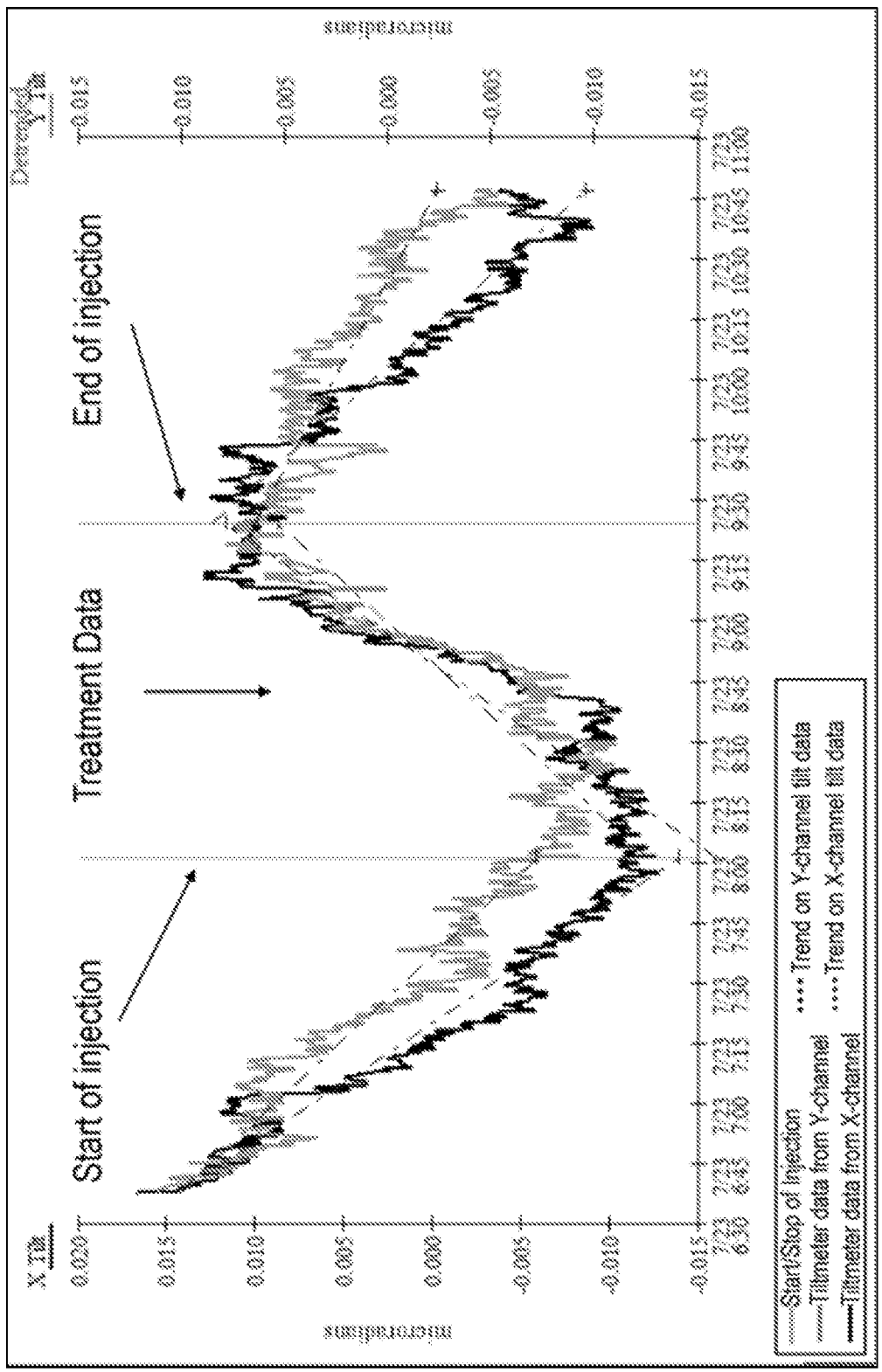
FIG. 16: Tiltmeter data from the Klatt No. 31-14H Bakken well in Dunn County, North Dakota (Pinnacle 2007). Note that tilt begins to return to original angle as soon as injection ceases and is close to its original inclination within 1.5 hours.

Evidence for Volumetric Flow—Tiltmeter Data: Evidence for Relatively High permeabilities than determined from traditional sample sizes is supported Tiltmeter data of FIG. 16. These data show a similar rapid response to the injection of fluids. While it is difficult, if not impossible, to calculate the permeability from these data, it seems clear that fluids are moving at rates that appear to be on the order of those found using the "pressure diffusion" equations of Shapiro.

Determining the Country Rock permeability requires identifying what Malin et al (2020) call a Representative Elementary Volume (REV) such that its permeability is representative of the larger volume of which it is a part. Because the GeoCritical Reservoir permeability field is highly heterogeneous and the size/frequency of the fractures follow GR, Malin et al (2020) point out that "it follows that the spatial distribution of permeability is power law." and thus there can be no REV. Effectively this means that the permeability scalar K, is a function of direction.

Figure 17:
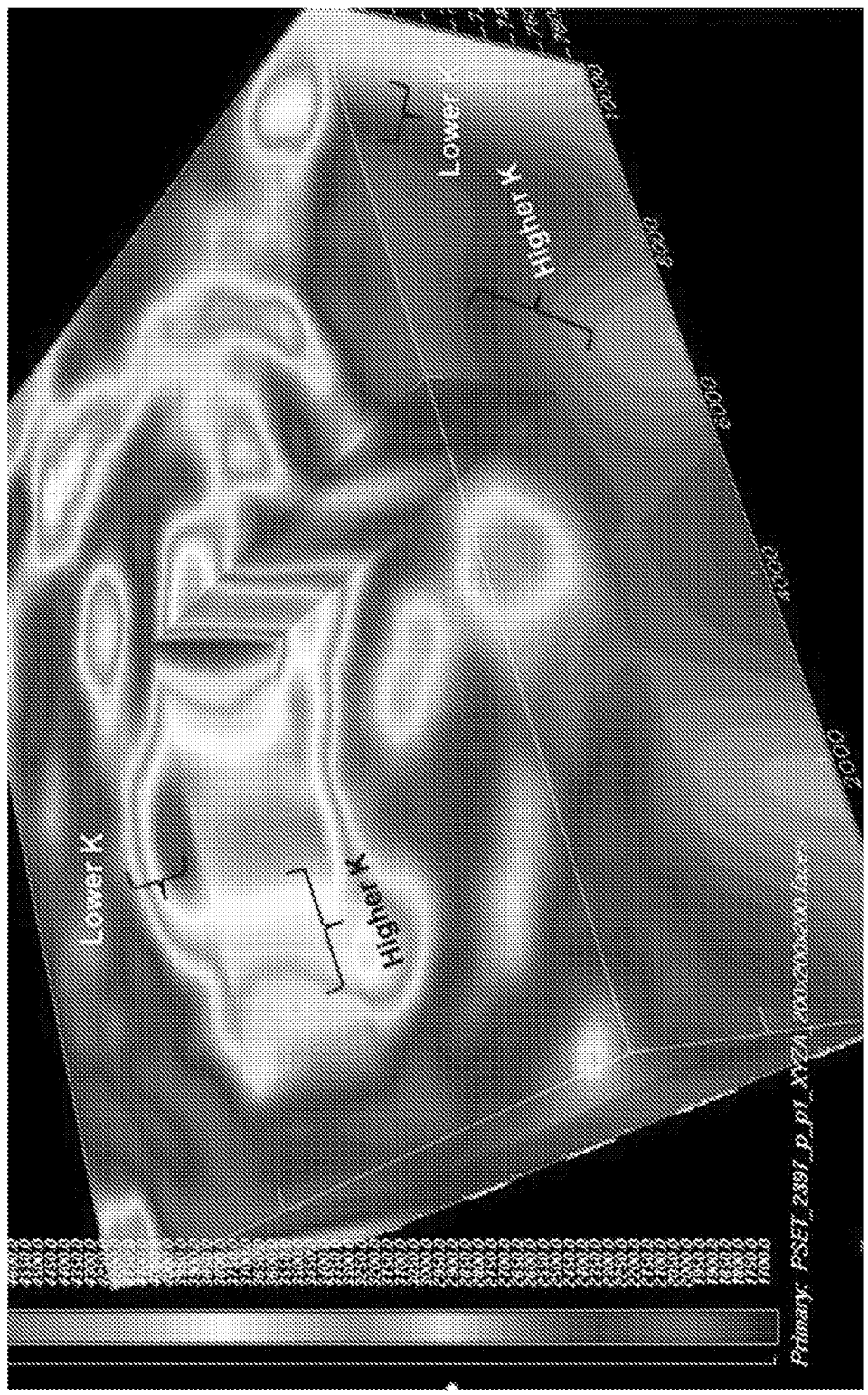
FIG. 17: Chair cut of Barnett full activity volume showing "Country Rock" semblance "clouds" and proposed interpretation of SS value gradients where lower gradients represent higher K and higher gradients lower K.

FULL ACTIVITY VOLUMES, SS CLOUDS AND AFI: DIRECT MAPPING OF THE RESERVOIR PERMEABILITY FIELD: FIG. 17 is a Full Activity Volume of part of the Barnett showing the ambient SS field. A striking aspect is the systematic variation in width of the SS "clouds" in all three directions, XY, XZ and YZ. How can we explain this systematic width variation?

The currently known parameters that affect the SS value are: Rock strength; Fracture density; Krauklis wave and crack failure emissions; Fluid content, We examine these parameters in terms of whether or not they show SS gradients.

Rock Strength: "Rock strength is expressed as SS "stratigraphy" where stratigraphic layers with a common strength vary little and not systematically in their SS value, i.e. rock strength cannot manifest as SS "clouds".

Fracture Density: Regions of high fracture density that can be resolved by FSI/TFI are expressed as discrete surfaces forming complex assemblages and do not manifest as SS clouds.

Krauklis Wave and Crack failure Emissions/Fluid content: The Krauklis Wave and fracture failure seismic emissions are a function of fluid content. The working hypothesis is that the higher the fluid content the greater the Krauklis wave and fracture failure emissions, i.e. the higher the semblance value. Further, fluid phase migration manifests as systematic continuous variation in content.

Thus, given the same lithology because the SS value is proportional to the fluid content it therefore is the only SS value parameter that can manifest as SS clouds showing gradients. Examples of this proportionality between fluid content and SS value resulting in SS value gradients is shown herein.

Because the only parameter that can express as gradients in the SS value is fluid content, it reasonable to hypothesize that the SS value gradients shown in Full Activity Volumes (FAV) are due to systematic change in fluid content i.e. increasing SS value reflects increasing fluid content while decrease in SS value reflects decrease in fluid content.

Darcys are a measure of flux or $m^3/sec$ which is proportional to the permeability K. Because any given FAV represents the same amount of time, it follows that for any given unit of time, the lower the SS value gradient, the further that fluids have migrated and therefore the higher the permeability K, while the steeper the SS value gradient, the lower the permeability K (FIG. 17). Accordingly it is reasonable to conclude that the combination of AFI and SS "clouds" is an actual visualization of the permeability field in its strict mathematical and physical sense.

Summary—Imaging the GeoCritical Reservoir Permeability Field

The foregoing shows that FSI/TFI can directly image the permeability field of the Earth's brittle crust in the form of the semblance clouds and AFI/TFI. It is shown that the features imaged are fluid filled fractures whose size range is consistent with the G-R power law size/frequency distribution, a known characteristic of the critical state of the Earth's brittle crust. Independent evidence demonstrates the presence of bulk fluid flow and measurable permeability. The GeoCritical Reservoir permeability field has the following properties:

It consists of two elements: (a) AFI/TFI which are regions of maximum fluid content and are of a size that permit direct imaging of their geometric characteristics; (b) Country Rock in which the AFI/TFI are embedded. The Country rock consists of fractures whose dominant size is in the micro to millimeter scale.

Semblance iso-surfaces decrease in SS value systematically away from regions of maximum fluid content (AFI/TFI), consistent with bulk flow away from regions of highest fluid content.

References for Example 2

Alvarez, W., Engelder, T., and Geiser, P. A., 1978. Classification of solution cleavage in pelagic limestones. Geology, 6 (5), 263-266.

Angus, D. A. and Verdon, J. P., 2012; Using micro-seismicity to estimate formation permeability for geological storage of CO2, Research Article available from Academia.

Bak, P., 1996, How Nature Works: The science of self-organized criticality, Springer-Verlag, New York, 212 pp.

Biot, M. A. 1962. Mechanics of deformation and acoustic propagation in porous media. J. appl. Physics, 33, 1482-1498.

Erslav, E. F., 1998, Limited, localized nonvolatile element flux and volume changein Appalachian slates, GSA Bulletin, July 1998; v. 110; no. 7; p. 900-915.

Geiser, P. A., 1974. Cleavage in some sedimentary rocks of the Central Valley and Ridge Province, Maryland. Geol. Soc. Amer. Bull., 85, 1399-1412.

Geiser, P. A., and Sansone, S., 1981. Joints, microfractures, and the formation of solution cleavage in limestone. Geology, 9(6), 280-285.

Geiser, P. A. and Engelder, T., 1983. The distribution of layer parallel shortening fabrics in the Appalachian foreland of New York and Pennsylvania: evidence for two non-coaxial phases of the Alleghenian orogeny. In: Hatcher, R., Williams, H., and Zeitz, I. (eds.), The Tectonics and Geophysics of Mountain Ranges. Geol. Soc. Amer. Mem. 158, 161-175.

Geiser, P. A., Vermilye, J., Scammell, R., Roecker, S., 2006. Seismic used to directly map reservoir permeability fields. Oil & Gas Journal, Dec. 11, Dec. 18, 2006.

Geiser, P., Lacazette, A. and Vermilye, J., 2012. Beyond "dots in a box", First Break, 30, 63-69.

Heffer, K. J., Fox, R. J. and McGill, C. A., 1995, Novel Techniques Show Links between Reservoir Flow Directionality, Earth Stress, Fault Structure and Geomechanical Changes in Mature Waterfloods, Society of Petroleum Engineers Annual Technical Conference & Exhibition, Dallas, Tx Oct. 22-25, 1995. SPE 30711.

Hilpert, M., Marsh, B. D., and Geiser, P. A., 2018, Method for estimating permeability of fractured rock formations from induced slow fluid pressure waves. U.S. Pat. No. 10,145,227.

Leary, P. C., 1997, Rock as critical-point system and the inherent implausibility of reliable earthquake prediction, Geophys. J. Int. 131:451-466.

Malin, P. E., Leary, P. C., Cathles, L. M. and Barton, C. C., 2020, Observational and Critical State Physics Descriptions of Long-Range Flow Structures, Geosciences, in press.

Marrett, R., Ortega, O. J., Kelsey, C. M., 1999, Extent of power-law scaling for natural fractures in rock, Geology; September 1999; v. 27; no. 9; p. 799-802.

Marshak, S. and Engelder, T., 1985, Development of cleavage in limestones of a fold-thrust belt in eastern New York, Journal of Structural Geology, 7, Nos. 3-4, 345-359.

Raleigh, C. B., Healy, J. and Bredehoeft, J., 1976, An experiment in earthquake control at Rangely, Colorado, Science 191: 1230-1237.

Robin, P. F., 1978, Pressure solution at grain-to-grain contacts: Geoch. Cosmochimica Acta., V. 42, p. 1383-89.

Shapiro, S. A., 2008, Microseismicity: A tool for Reservoir Characterization, Education Tour Series CIS, EAGE publications, 67 pp.

Shapiro, S. A., and Dinske, C., 2009, Fluid-induced seismicity: Pressure diffusion and hydraulic fracturing, Geophysical Prospecting, 57, 301-310.

Sicking, C. J. and Malin, P. E., 2019, Fracture Seismic: Mapping Subsurface Connectivity, Geosciences 9, no. 12: 508; https://doi.org/10.3390/geosciences9120508.

Tary, J. B., M. Van der Baan, B. Sutherland, and D. W. Eaton (2014a), Characteristics of fluid induced resonances observed during microseismic monitoring, Journal of Geophysical Research, 119, 8207-8222.

Tary, J B, M. Van der Baan, D W. Eaton, (2014b), Interpretation of resonance frequencies recorded during hydraulic fracturing treatments Journal of Geophysical Research: Solid Earth 119 (2), 1295-1315.

Wright and Platt, Wright, T. O. and Platt, L. B., 1982, Pressure dissolution and cleavage in the Martinsburg shale, American J. Science, v. 282, p 122-135.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Every device, system, combination of components, or method described or exemplified herein can be used to practice the invention, unless otherwise stated.

Whenever a range is given in the specification, for example, a physical dimension or a time range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein, any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that devices, systems, and methods other than those specifically exemplified can be employed in the practice of the invention without resort to undue experimentation. All art-known functional equivalents, of any such devices and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

I claim:

1. A method for determining a permeability field architecture of at least a portion of a fluid reservoir, the method comprising the steps of:
    establishing a seismic array in the vicinity of a wellbore in fluid communication with said fluid reservoir; wherein said seismic array is operable to acquire seismic energy emission data and said seismic array comprises a plurality of seismic energy sensors;
    generating a change in fluid pressure in said fluid reservoir;
    acquiring seismic energy emission data from said seismic array prior to and after said change in fluid pressure;
    processing a selected portion of said seismic energy emission data to generate three dimensional spatial representations of a fluid pressure wave through said portion of said fluid reservoir; wherein said processing further comprises identifying a semblance band utilizing semblance filtering techniques;
    determining a permeability field architecture of said portion of said fluid reservoir based on said fluid pressure wave; and
    identifying at least one high permeability pathway in said fluid reservoir, wherein said high permeability pathway corresponds to a medial surface of said fluid reservoir.

2. The method of claim 1, wherein said permeability field architecture includes naturally occurring fractures and faults in said fluid reservoir.

3. The method of claim 1, wherein said high permeability pathway has a permeability selected from the range of 10 to $10^6$ times the average permeability of said portion of said fluid reservoir.

4. The method of claim 1, further comprising generating a permeability model from said fluid pressure wave propagating through said portion of said fluid reservoir.

5. The method of claim 1, wherein said permeability field architecture comprises a plurality of voxels and each of said voxels has a determined permeability.

6. The method of claim 5, wherein each of said voxels has a lateral dimension, a vertical dimension or both of less than or equal to 10 m.

7. The method of claim 5, wherein each of said voxels has a lateral dimension, a vertical dimension or both of less than or equal to 5 m.

8. The method of claim 1, wherein said step of acquiring seismic energy emission data occurs continuously over a period of time.

9. The method of claim 8, wherein said step of processing said selected portion of said seismic energy data includes generating a time lapse display.

10. The method of claim 8, wherein said time period comprises said step of generating a change of fluid pressure in said fluid reservoir.

11. The method of claim 1, wherein said step of processing said selected portion of seismic energy data further comprises determining a permeability scalar of said fluid reservoir.

12. The method of claim 11, wherein said permeability scalar is determined from a velocity of a fluid pressure wave through said portion of said fluid reservoir.

13. The method of claim 1, wherein said fluid reservoir contains hydrocarbons.

14. The method of claim 1, further comprising the step of using a peak picker method to locate a plurality of adjacent voxels having a highest semblance value to identify a surface one voxel in thickness corresponding to a high permeability pathway.

15. The method of claim 1, wherein the medial surface comprises a plurality of medial surfaces.

16. A method for determining a permeability field architecture of at least a portion of a fluid reservoir, the method comprising the steps of:
    establishing a seismic array in the vicinity of a wellbore in fluid communication with said fluid reservoir; wherein said seismic array is operable to acquire seismic energy emission data and said seismic array comprises a plurality of seismic energy sensors;
    generating a change in fluid pressure in said fluid reservoir;
    continuously acquiring seismic energy emission data from said seismic array during said change in fluid pressure;
    processing a selected portion of said seismic energy emission data to generate a plurality of voxels corresponding to three dimensional spatial representations of fluid flow through said portion of said fluid reservoir, wherein said processing step includes identifying a semblance band for said data utilizing semblance filtering techniques;
    generating a value of the permeability scalar K from a velocity of a fluid pressure wave through said portion of said fluid reservoir;
    determining a permeability field architecture of said portion of said fluid reservoir based on said fluid flow; and
    identifying at least one high permeability pathway in said fluid reservoir, wherein said high permeability pathway corresponds to a medial surface of said fluid reservoir.

17. The method of claim 16, wherein said step of acquiring seismic energy emission data occurs continuously over a period of time and said step of processing said selected portion of said seismic energy data includes generating a time lapse display.

18. A method for identifying a high permeability pathway in a permeability field architecture of at least a portion of a fluid reservoir, comprising:
    establishing a seismic array in the vicinity of a wellbore in fluid communication with said fluid reservoir; wherein said seismic array is operable to acquire seismic energy emission data and said seismic array comprises a plurality of seismic energy sensors;
    generating a change in fluid pressure is said fluid reservoir;
    acquiring seismic energy emission data from said seismic array prior to and after said change in fluid pressure;
    processing a selected portion of said seismic energy emission data to generate three dimensional spatial representations of fluid flow through said portion of said fluid reservoir, wherein said processing step includes identifying a semblance band for said data utilizing semblance filtering techniques;
    determining a permeability field architecture of said portion of said fluid reservoir based on a fluid pressure wave generated from said fluid flow; and
    identifying at least one high permeability pathway in said fluid reservoir, wherein said high permeability pathway corresponds to a medial surface of said fluid reservoir.

19. The method of claim 18, wherein said high permeability pathway has a permeability selected from the range of 10 to $10^6$ times the average permeability of said portion of said fluid reservoir.

* * * * *